(12) United States Patent
Martinez et al.

(10) Patent No.: US 7,283,125 B2
(45) Date of Patent: Oct. 16, 2007

(54) TEXT INPUT DEVICE AND ADAPTER MECHANISM

(75) Inventors: Greg Martinez, Seattle, WA (US);
William P. Stiles, Bothell, WA (US);
Richard S. Lum, Redmond, WA (US);
Robert S. Walker, Mukilteo, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 10/434,457

(22) Filed: May 9, 2003

(65) Prior Publication Data
US 2004/0224765 A1   Nov. 11, 2004

(51) Int. Cl.
*G09G 5/00* (2006.01)
(52) U.S. Cl. ..................... 345/168; 345/169
(58) Field of Classification Search ........ 345/156–184; 463/37; 361/680; 242/610.6; 248/300–2, 248/309.1, 121, 126, 200, 918; 400/472
See application file for complete search history.

(56) References Cited

U.S. PATENT DOCUMENTS

| | | | |
|---|---|---|---|
| 138,789 A | | 5/1873 | Solomon |
| 789,045 A | | 5/1905 | Singh |
| 863,657 A | * | 8/1907 | Buckley ..................... 110/317 |
| 876,670 A | | 1/1908 | Lee |
| 999,538 A | | 8/1911 | Genest |
| 4,313,227 A | | 1/1982 | Eder |
| 4,469,330 A | | 9/1984 | Asher |
| 5,408,382 A | * | 4/1995 | Schultz et al. ............... 361/686 |
| 5,612,691 A | * | 3/1997 | Murmann et al. ............ 341/22 |
| 5,708,560 A | * | 1/1998 | Kumar et al. ................ 361/680 |
| 5,759,100 A | * | 6/1998 | Nakanishi ..................... 463/37 |

(Continued)

OTHER PUBLICATIONS

"Reviews: ASCII Keyboard Controller"; Internet article printed from <http://www.planetgamecube.com/reviews.cfm?action=hwprofile&id=205>; date of first publication unknown, but believed prior to Mar. 29, 2003.

(Continued)

*Primary Examiner*—Amr A. Awad
*Assistant Examiner*—Tammy Pham
(74) *Attorney, Agent, or Firm*—Banner & Witcoff, Ltd.

(57) ABSTRACT

A text input device for attachment to a game controller includes a small-sized housing, upper and lower faces, a plurality of text entry keys disposed on the upper face, and an attachment interface disposed on the lower face. A bracket for attaching the text input device to a game controller includes an arm portion having first and second ends. An attachment plate is fixed to the first end and has at least one engaging member protruding therefrom and engaging the attachment interface of the text input device. The bracket further includes at least one retaining member protruding from the second end in a position such that, when the attachment plate is coupled to a first part of a game controller and the retaining member is in contact with a second part of the game controller, a force is applied to a face of the retaining member by the second part of the game controller so as to maintain the coupling of the attachment plate to the game controller first part. The attachment plate engaging member is non-destructively disengagable from the attachment interface of the text input device, and is subsequently re-engagable so as to permit subsequent non-destructive disengagement.

16 Claims, 30 Drawing Sheets

U.S. PATENT DOCUMENTS

| | | | |
|---|---|---|---|
| 5,874,906 | A | 2/1999 | Willner et al. |
| 5,896,125 | A * | 4/1999 | Niedzwiecki ............... 345/168 |
| 5,957,595 | A * | 9/1999 | Chen ......................... 400/472 |
| 5,984,548 | A | 11/1999 | Willner et al. |
| 6,071,194 | A | 6/2000 | Sanderson et al. |
| 6,288,709 | B1 | 9/2001 | Willner et al. |
| 6,461,242 | B2 * | 10/2002 | Takeda et al. ................ 463/38 |
| 6,512,511 | B2 | 1/2003 | Willner et al. |
| 6,600,479 | B1 * | 7/2003 | Smith et al. ................ 345/163 |
| 6,671,170 | B2 | 12/2003 | Webb et al. |
| 6,712,323 | B1 * | 3/2004 | Cheung et al. ............. 248/201 |
| 6,727,890 | B2 | 4/2004 | Andres et al. |
| 6,788,285 | B2 | 9/2004 | Paolucci et al. |
| 6,874,029 | B2 | 2/2005 | Hutcheson et al. |
| 2002/0104944 | A1 * | 8/2002 | Pogatetz et al. ......... 248/309.1 |
| 2002/0126440 | A1 | 9/2002 | Webb et al. |
| 2002/0186206 | A1 * | 12/2002 | Lee et al. |
| 2002/0186525 | A1 * | 12/2002 | Singh ........................ 361/680 |
| 2002/0195533 | A1 * | 12/2002 | Gilberton ................ 248/316.1 |
| 2003/0169728 | A1 | 9/2003 | Choi |
| 2005/0275165 | A1 * | 12/2005 | Hussaini et al. ........ 273/148 B |

OTHER PUBLICATIONS

"AlphaGrip" web page <http://www.alphagrip.com>; date of first publication unknown, but believed prior to Apr. 1, 2003.

"The Future of Touch typing is here"; Internet article printed from <http://www.twomobile.com/new_112800_alphagrip.html>; date of first publication unknown, but believed prior to Apr. 1, 2003.

Photograph printed from >http://www.twomobile.com/pics_112800_alphagrip_02/html>; date of first publication unknown, but believed prior to Apr. 1, 2003.

Photograph printed from <http://www.planetgamecube.com/media.cfm?action=hwshot&id=92&seq=1>; date of first publication unknown, but believed prior to Mar. 29, 2003.

Photograph printed from >http://www.planetgamecube.com/media.cfm?action=hwshot&id=92&seq=2>; date of first publication unknown, but believed prior to Mar. 29, 2003.

Photograph printed from <http://www.planetgamecube.com/media.cfm?action=hwshot&id=92&seq=3>; date of first publication unknown, but believed prior to Mar. 29, 2003.

Photograph printed from <http://www.planetgamecube.com/media.cfm?action=hwshot&id=92&seq=4>; date of first publication unknown, but believed prior to Mar. 29, 2003.

Photograph printed from <http://www.planetgamecube.com/media.cfm?action=hwshot&id=92&seq=5>; date of first publication unknown, but believed prior to Mar. 29, 2003.

Photograph printed from >http://www.planetgamecube.com/media.cfm?action=hwshot&id=92&seq=6>; date of first publication unknown, but believed prior to Mar. 29, 2003.

Photograph printed from <http://www.planetgamecube.com/media.cfm?action=hwshot&id=92&seq=7>; date of first publication unknown, but believed prior to Mar. 29, 2003.

Photograph printed from <http://www.planetgamecube.com/media.cfm?action=hwshot&id=92&seq=8>; date of first publication unknown, but believed prior to Mar. 29, 2003.

Photograph printed from <http://www.planetgamecube.com/media.cfm?action=hwshot&id=92&seq=9>; date of first publication unknown, but believed prior to Mar. 29, 2003.

Photograph printed from <http://www.planetgamecube.com/media.cfm?action=hwshot&id=92&seq=10>; date of first publication unknown, but believed prior to Mar. 29, 2003.

Apr. 18, 2005 Examination Report in EP04007987.3.

European Search Report, Jun. 28, 2004.

Patent Abstract of Japan, Publication No. JP 2003 093742 A, vol. 2003, No. 08, Apr. 2, 2003.

* cited by examiner

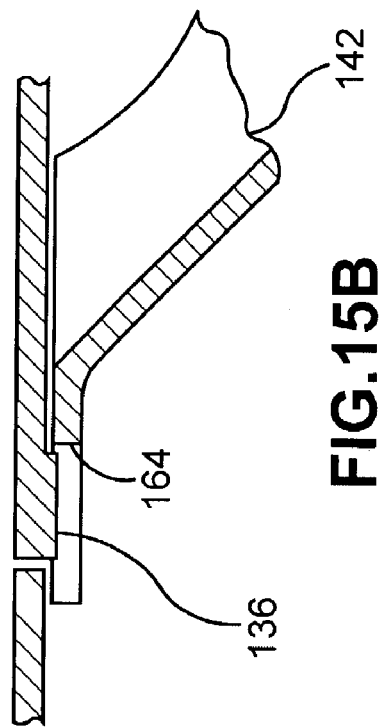
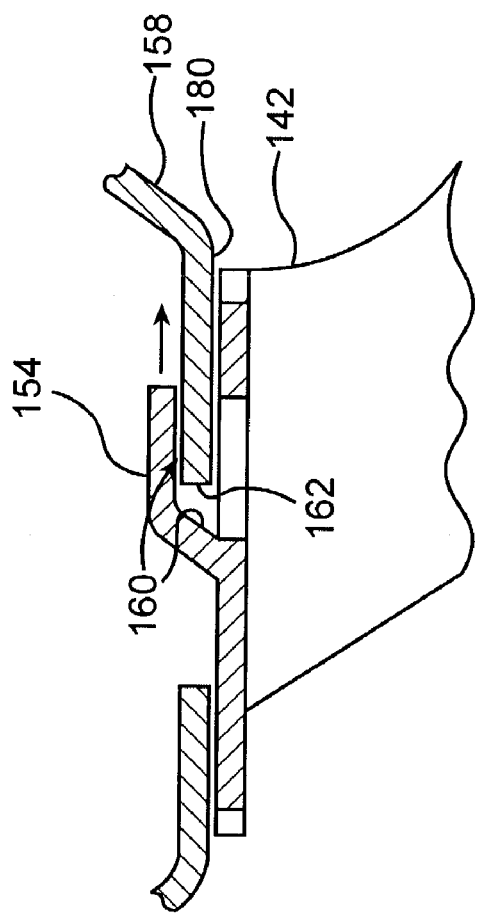

TEXT INPUT DEVICE AND ADAPTER MECHANISM

CROSS-REFERENCES TO RELATED APPLICATIONS

This application is related to the U.S. patent application titled "Controller with Removably Attachable Text Input Device," filed simultaneously herewith and having Ser. No. 10/434,456.

FIELD OF THE INVENTION

This invention relates game controllers and other devices used for providing input in connection with computer game play. More particularly, this invention relates to a text input device that can be adapted to a hand-held game controller.

BACKGROUND OF THE INVENTION

Games have long been an important aspect of computer technology, both from hardware and software standpoints. As computer technology has advanced, so too has the quality and sophistication of computer games. Computer games may be played on personal computers and other hardware and software environments that have non-game uses. Games may also be played in environments dedicated or oriented to game play. For example, a game "console" may include a computer processor, memory and other hardware that is dedicated to game play. Often, game consoles provide audio and visual output through a television, and may be designed to read various data storage media in order to play different games.

In both console and other types of computer games, a user often provides input to the game by way of a game controller. Typically, a game controller is a handheld device that a game player can conveniently hold in one or two hands while playing a game. Designs vary widely, but most game controllers have multiple buttons and other controls which a user can press or otherwise manipulate, and which cause particular signals to be sent to the computer on which the game is running. The game controller, depending on the game software that is currently operating, may then interpret that signal in a manner consistent with the game program. For example, pushing a D-pad or thumb stick in one direction may cause an object in the game to move in a particular manner. Pushing a button or squeezing a trigger may cause a virtual weapon to be fired. These and other types of game play input are well known.

In another aspect of computer games known as on-line play, game players are able to play games with users who may be in distant locations. Instead of requiring all players to be playing a game on the same game console or other computer (which often limits play to persons in the same room), on-line play allows players using different game consoles or other computers to connect those consoles via the Internet or other network connection. With on-line play, persons in different geographic regions can simultaneously play against (or with) each other in the same game. The continued growth of the Internet and proliferation of broadband access to the Internet has no doubt increased the popularity of on-line game playing. It is now possible for tens or even hundreds of persons to be simultaneously playing the same game.

In addition to simulating weapons discharge, character and screen object movements and other types of game-related interactions, inter-player communication is common in on-line game play. Many games allow players to coordinate their efforts, and communication between players is thus helpful. Some games may allow players to trade weapons or other virtual items, to call for help from other players, or to otherwise exchange information. In many cases, players may wish to communicate simply to pass time or for social interaction unrelated to the game they may be playing.

Many games allow players to communicate verbally. A player might speak into a microphone, and other players are then able to hear him or her. Although convenient, this method of communication can be less useful as the number of players increases. For example, if twenty people are playing a game and also sending messages, the chatter level may become so frequent that a player cannot effectively listen for messages of interest and still play the game. A player may also want to limit message recipients out of privacy concerns, to avoid communicating tactics to opposing players, and for various other reasons.

Many games and/or on-line gaming environments allow players to direct textual messages to specific players in the game. However, most game controllers either lack the ability to provide textual input to the game, or have extremely limited text input capabilities. To send a text message, a player is thus required to put down the game controller and use a keyboard. Moreover, many games are played in a living room or other setting in which the player may be sitting on a couch, floor or other location where it might be inconvenient to hold a keyboard while trying to type a message, and where there may be no convenient place to rest a keyboard. It would therefore be useful if a hand-held game controller could also provide the ability to conveniently input text.

There have been various attempts to provide a hand-held device that can be used for both game play and text input. U.S. Pat. No. 6,512,511 (Willner et al.) describes a "hand grippable combined keyboard and game controller system" which is purportedly usable for both textual input and game play. The device is separable into two halves, each of which can be held in one hand and perform the function of the other half. The '511 patent also describes a small computer being interposed between the two halves. However, the described device requires a user to learn a scheme for text input in which multiple buttons dispersed on various surfaces of the device correspond to certain letters or other characters. The user cannot visualize all of those buttons at once. In other words, the user must turn the device over to expose additional buttons positioned on the device underside. U.S. Pat. Nos. 6,288,709, 5,984,548 and 5,874,906 (all to Willner at al.) describe further embodiments of handheld data entry systems that can alternately be used for text entry or game play. However, these additional embodiments also require a user to learn a scheme by which letters and other characters are mapped to particular buttons dispersed across the device, which buttons cannot be simultaneously visualized. The above-described Willner patents also describe activation of a "mode selection switch" to signal whether the device buttons are providing text or character input.

In another line of development, a game controller and keyboard have been combined into a "keyboard controller" sold by the Ascii Co. of Japan. This device comprises a keyboard that is approximately the size of a laptop computer keyboard, and has hand grips and game play controls located at the sides. Although this device does combine game control with text entry, its size may not be optimal under certain conditions. For example, many users could not input text using the keyboard while holding the game controller grips at the side of the device, and would thus have to place the device on a table or other surface in order to enter text.

For these and other reasons, there remains a need for systems and methods that permit convenient text input while using a game controller.

SUMMARY OF THE INVENTION

The present invention addresses the challenges described above by providing a small-sized text input device that can be attached to and removed from a game controller. In some embodiments, the invention includes an attachment bracket for coupling a text input device to a game controller. In one embodiment, a text input device includes a housing having relatively small dimensions, and further includes upper and lower faces. A plurality of text entry keys is located on the upper face, and an attachment interface is disposed on the lower face. A plurality of conformal wings protrudes from the housing. In another embodiment, a text input device has a small housing, the housing having upper and lower faces. A plurality of text entry keys is located on the upper face and an attachment interface is disposed on the lower face. A cable emanates from the housing for communication of signals resulting from user activation of one or more text entry keys, and a connector is attached to the cable.

In another embodiment, the invention includes an attachment bracket for coupling a text input device to a game controller. The bracket has an arm portion with first and second ends and an attachment plate fixed to the first end. The attachment plate has at least one engaging member fixed to the plate. At least one retaining member protrudes from the second end. The retaining member is positioned such that, when the attachment plate is coupled to a first part of a game controller and the retaining member is in contact with a second part of the game controller, a force is applied to a face of the retaining member by the second part of the game controller. In this manner, the coupling of the attachment plate to the game controller first part is maintained.

Further aspects and advantages of the invention are described below, or will be apparent to persons skilled in the art once such persons are provided with the information contained herein.

BRIEF DESCRIPTION OF THE DRAWINGS

FIG. 15A is a cross section taken along lines 15A-15A of FIG. 14 and rotated 180°.

FIG. 15B is a cross section taken along lines 15B-15B of FIG. 14 and rotated 180°.

DETAILED DESCRIPTION OF THE PREFERRED EMBODIMENTS

Definitions

Unless otherwise indicated, various terms as used in this specification and in the claims have the following meanings.

Game play control: A control device which can be moved or otherwise selectively activated by a user so as to generate (or modify) a signal, which signal is recognized by game software and causes some event or action in a computer game that is played by executing instructions in that software. Examples of game play controls include buttons, switches, D-pads (i.e., a direction pad, also known as a cross-key pad), thumb wheels, track balls, joysticks, thumb sticks (i.e., small joysticks positioned so as to be movable by a player's thumb when used for computer game play) and triggers. A game play control may be mechanically activated by a user (e.g., by physically moving a switch, button, or other control) or activated by non-mechanical actions (e.g., by sensing body heat, sensing changes in capacitive or RF field, etc.).

Game controller: A device having multiple game play controls.

Simultaneously viewable: A group of keys on a device are simultaneously viewable if all keys in the group can be viewed from a single angle, i.e., without having to rotate or otherwise reposition the device.

Text characters: Letters, numerals, punctuation marks and symbols (e.g., ☺, ♠, ✓, ➜, $, *, @, £, ¥, §, ®) that can be represented by unique codes (e.g., ASCII, Unicode, etc.). Text characters also include non-English language (e.g., Japanese, Chinese, Korean, Arabic, Russian, etc.) characters, as well as recognized codes such as a space, a line or page break, etc.

Text input device: An input device having a plurality of text keys. Each text key generates a specific code that corresponds to a letter, numeral, symbol or other text character. A text key may, in combination with one or more other keys, generate a different code that corresponds to a different text character. Although a standard keyboard is an example of a text input device, other devices having fewer or more features than a keyboard could also be text input devices. A text input device may have keys, buttons or other controls that are not text keys.

Example Operating Environment

Figure 1:
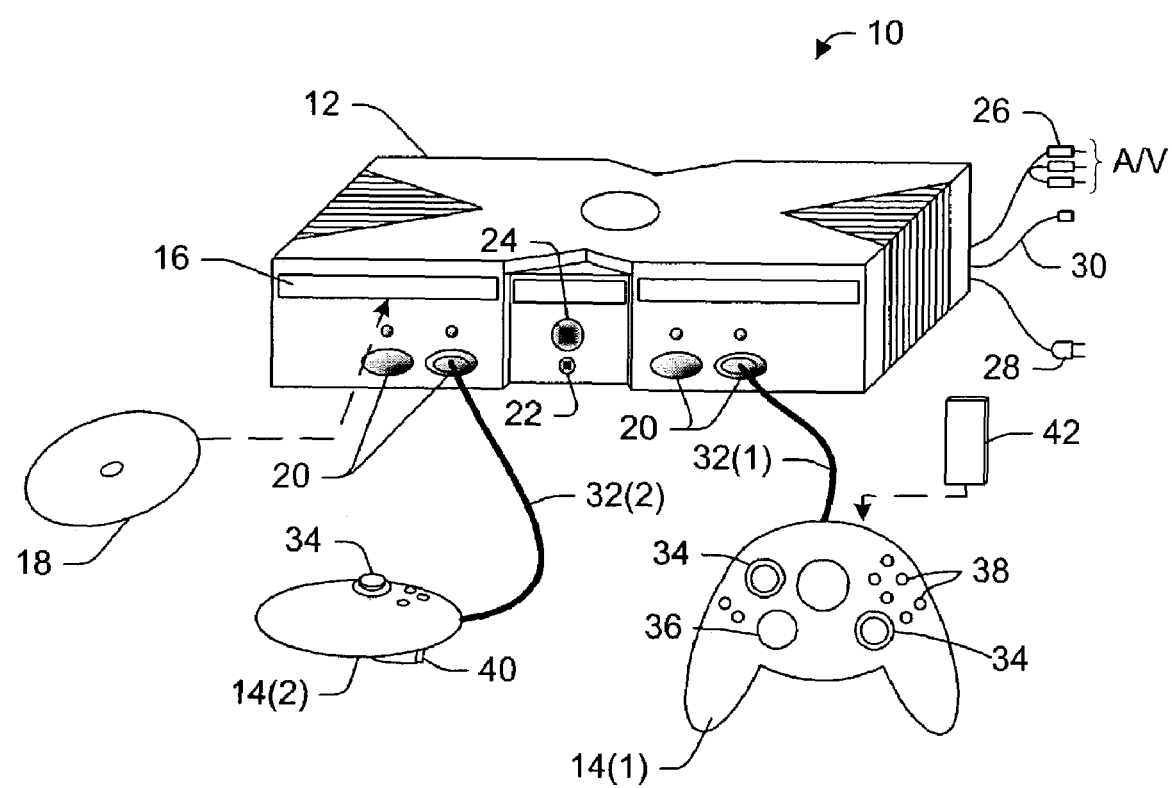
FIG. 1 illustrates an exemplary gaming system.

FIG. 1 shows an exemplary gaming system 10. Although gaming system 10 will be described in some detail and used as an example to describe the invention, the invention is not limited to the particular example(s) provided. Instead, the invention is only limited by the attached claims. Gaming system 10 includes a game console 12 and up to four game controllers, as represented by game controllers 14(1) and 14(2). Game console 12 is equipped with an internal hard disk drive (see FIG. 2) and a portable media drive 16 that supports various forms of portable storage media as represented by optical storage disc 18. Examples of suitable portable storage media include DVD, CD-ROM, game discs, and so forth.

Game console 12 has four slots 20 on its front face to support up to four game controllers, although the number and arrangement of slots may be modified. A power button 22 and an eject button 24 are also positioned on the front face of game console 12. Power button 22 switches power to the game console and eject button 24 alternately opens and closes a tray of the portable media drive 16 to allow insertion and extraction of storage disc 18.

Game console 12 connects to a television or other display (not shown) via A/V interfacing cables 26. A power cable 28 provides power to the game console. Game console 12 may further be configured with broadband capabilities, as represented by the cable or modem connector 30 to facilitate access to a network, such as the Internet.

Each game controller 14 is coupled to game console 12 via a wire or wireless interface. In the illustrated implementation, the game controllers are USB (Universal Serial Bus) compatible and are connected to game console 12 via serial cables 32(1) and 32(2). Game controllers 14(1) and 14(2) may be equipped with any of a wide variety of game play controls. As illustrated in FIG. 1, each game controller 14 is equipped with two thumb sticks 34, a D-pad 36, buttons 38, and two triggers 40. These mechanisms are merely representative, and other known control mechanisms may be substituted for or added to those shown in FIG. 1.

A memory unit (MU) 42 may be inserted into game controller 14 or game console 12 to provide additional and portable storage. Portable memory units enable users to store game parameters and port them for play on other consoles. For example, a user can save a game to a memory unit 42 using a particular game console then use that saved game data with a game executed on a different game console. In the described implementation, each game controller is configured to accommodate up to two memory units 42, although more or less than two units may be employed in other implementations. A particular game console 12 may be configured to accommodate any number of memory units 42.

Gaming system 10 may also be capable of playing music and videos in addition to games. With the different storage offerings, titles can be played from the hard disk drive or portable medium 18 in drive 16, from an online source, or from a memory unit 42. A sample of what gaming system 10 is capable of playing back could include: (1) game titles played from CD and DVD discs, from the hard disk drive, or from an online source; (2) digital music played from a CD in portable media drive 16, from a file on the hard disk drive (e.g., WINDOWS MEDIA Audio (WMA) format), or from online streaming sources; and/or (3) digital audio/video played from a DVD disc in the portable media drive 16, from a file on the hard disk drive (e.g., Active Streaming Format), or from online streaming sources.

Figure 2:
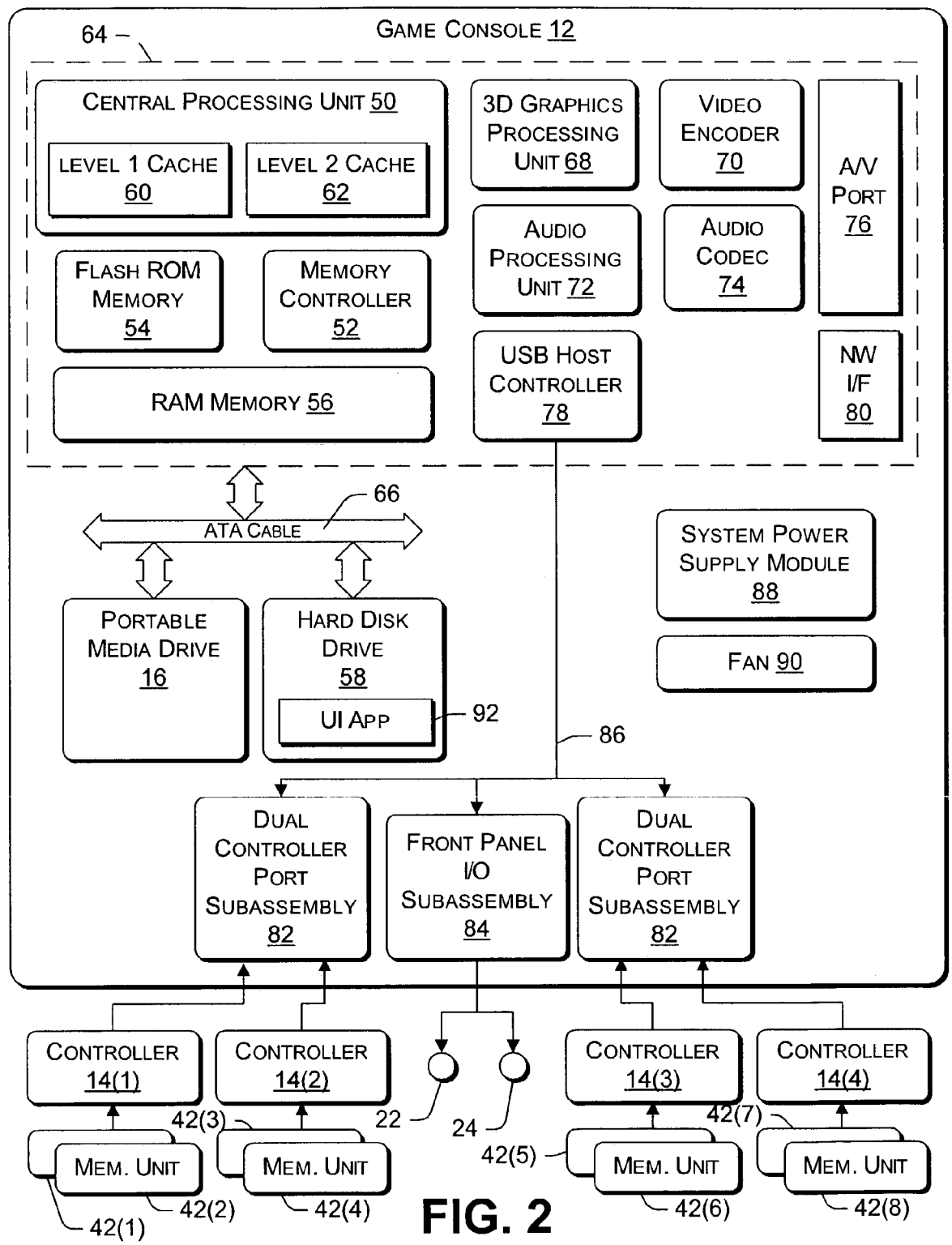
FIG. 2 is a block diagram of the gaming system of FIG. 1.

FIG. 2 shows functional components of gaming system 10 in more detail. Game console 12 has a central processing unit (CPU) 50 and a memory controller 52 that facilitates processor access to various types of memory, including flash ROM (Read Only Memory) 54, a RAM (Random Access Memory) 56, a hard disk drive 58, and portable media drive 16. CPU 50 is equipped with a level 1 cache 60 and a level 2 cache 62 to temporarily store data and hence reduce the number of memory access cycles, thereby improving processing speed and throughput.

CPU 50, memory controller 52, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, CPU 50, memory controller 52, ROM 54, and RAM 56 are integrated onto a common module 64. In this implementation, ROM 54 is configured as a flash ROM that is connected to memory controller 52 via a PCI (Peripheral Component Interconnect) bus and a ROM bus (neither of which are shown). RAM 56 is configured as multiple DDR SDRAM (Double Data Rate Synchronous Dynamic RAM) that are independently controlled by the memory controller 52 via separate buses (not shown). Hard disk drive 58 and portable media drive 16 are connected to the memory controller via the PCI bus and an ATA (AT Attachment) bus 66.

A 3D graphics processing unit 68 and a video encoder 70 form a video processing pipeline for high speed and high resolution graphics processing. Data is carried from the graphics processing unit 68 to video encoder 70 via a digital video bus (not shown). An audio processing unit 72 and an audio codec (coder/decoder) 74 form a corresponding audio processing pipeline with high fidelity and stereo processing. Audio data is carried between audio processing unit 72 and audio codec 74 via a communication link (not shown). The video and audio processing pipelines output data to an A/V (audio/video) port 76 for transmission to a television or other display. In the illustrated implementation, video and audio processing components 68-76 are mounted on module 64.

Also implemented on module 64 are a USB host controller 78 and a network interface 80. USB host controller 78 is coupled to CPU 50 and memory controller 52 via a bus (e.g., PCI bus) and serves as host for the peripheral game controllers 14. The network interface 80 provides access to a network (e.g., the Internet, home network, etc.) and may be any of a wide variety of various wired or wireless interface components including an Ethernet card, a modem, a BLUE-TOOTH module, a cable modem, and the like.

Game console 12 has two dual controller support subassemblies 82(1) and 82(2), with each subassembly supporting two of game controllers 14(1)-14(4). A front panel I/O subassembly 84 supports the functionality of power button 22 and eject button 24, as well as any LEDs (light emitting diodes) or other indicators exposed on the outer surface of the game console. Subassemblies 82(1), 82(2), and 84 are coupled to the module 64 via one or more cable assemblies 86.

Eight memory units 42(1)-42(8) are illustrated as being connectable to the four game controllers 14(1)-14(4), i.e., two memory units for each game controller. Each memory unit 42 offers additional storage on which games, game parameters, and other data can be stored. When inserted into a game controller, a memory unit 42 can be accessed by the memory controller 52. Additionally, one or more memory units 42 may be inserted into game console 12 and accessed by memory controller 52.

A system power supply module 88 provides power to the components of gaming system 10. A fan 90 cools the circuitry within game console 12.

Game console 12 implements a uniform media portal model that provides a consistent user interface and navigation hierarchy to move users through various entertainment areas. The portal model offers a convenient way to access content from multiple different media types—game data, audio data, and video data—regardless of the media type inserted into portable media drive 16. To implement the uniform media portal model, a console user interface (UI) application 92 is stored on hard disk drive 58. When the game console is powered on, various portions of console application 92 are loaded into RAM 56 and/or caches 60, 62 and executed on CPU 50. Console application 92 presents a graphical user interface that provides a consistent user experience when navigating to different media types available on the game console.

Gaming system 10 may be operated as a standalone system by simply connecting the system to a television or other display. In this standalone mode, gaming system 10 allows one or more players to play games, watch movies, or listen to music. However, with the integration of broadband connectivity made available through network interface 80, gaming system 10 may further be operated as a participant in a larger network gaming community.

Figure 3:
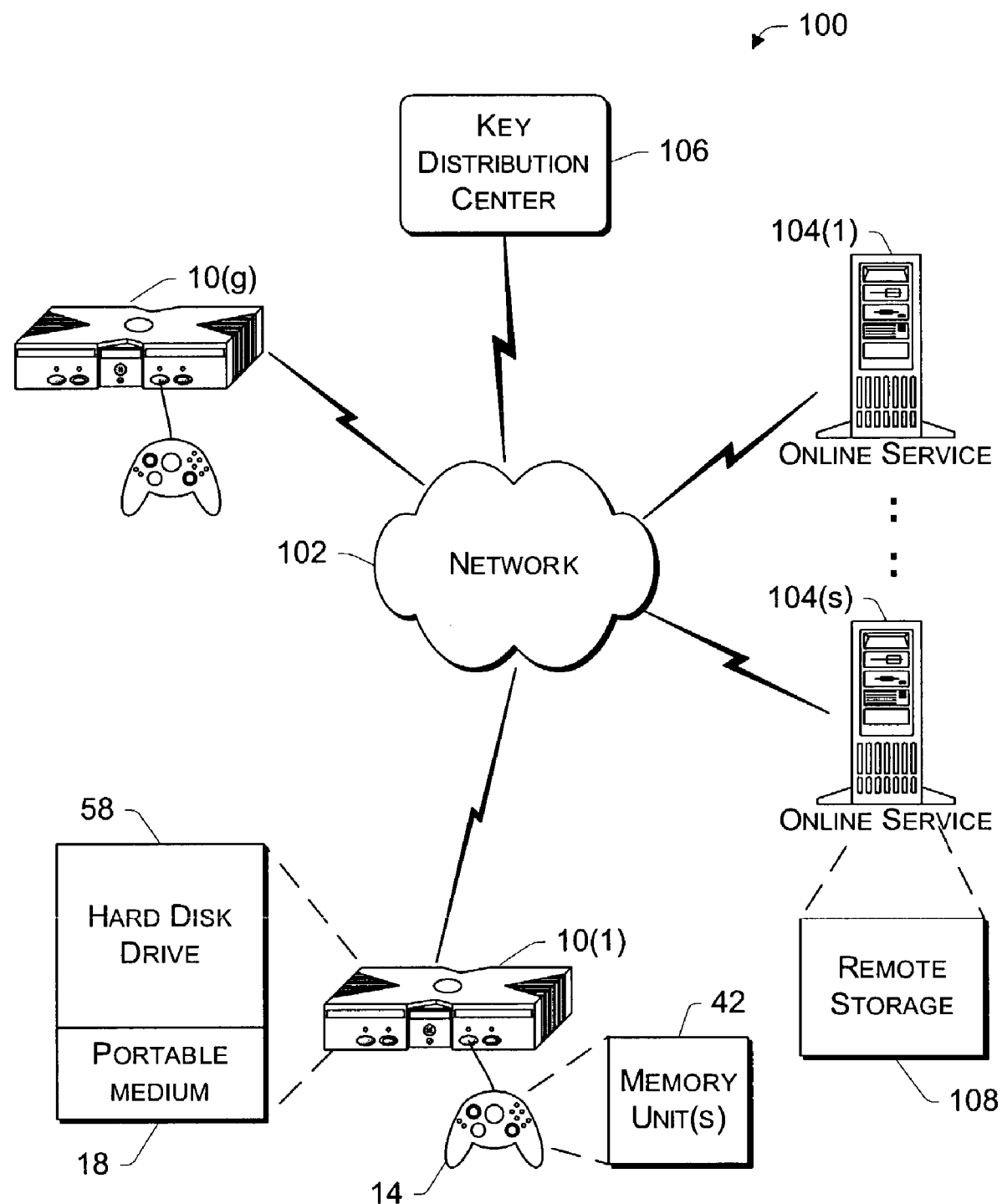
FIG. 3 illustrates a network gaming system in which the gaming system of FIG. 1 is connected via a network to other consoles and services.

FIG. 3 shows an exemplary network gaming environment 100 that interconnects multiple gaming systems 10(1), . . . , 10(g) via a network 102. Network 102 represents any of a wide variety of data communications networks. It may include public portions (e.g., the Internet) as well as private portions (e.g., a residential Local Area Network (LAN)), as well as combinations of public and private portions. Network 102 may be implemented using any one or more of a wide variety of conventional communications media including both wired and wireless media. Any of a wide variety of communications protocols can be used to communicate data via network 102, including both public and proprietary protocols. Examples of such protocols include TCP/IP, IPX/SPX, NetBEUI, etc.

In addition to gaming systems 10, one or more online services 104(1), . . . , 104(s) may be accessible via network 102 to provide various services for the participants, such as hosting online games, serving downloadable music or video files, hosting gaming competitions, serving streaming audio/video files, and the like. Network gaming environment 100 may further involve a key distribution center 106 that plays a role in authenticating individual players and/or gaming systems 10 to one another as well as online services 104. Distribution center 106 distributes keys and service tickets to valid participants that may then be used to form games amongst multiple players or to purchase services from online services 104.

Network gaming environment 100 introduces another memory source available to individual gaming systems 10—online storage. In addition to portable storage medium 18, hard disk drive 58, and memory unit(s) 42, gaming system 10(1) can also access data files available at remote storage locations via network 102, as exemplified by remote storage 108 at online service 104(s).

Game Controller and Text Input Device

Figure 4:
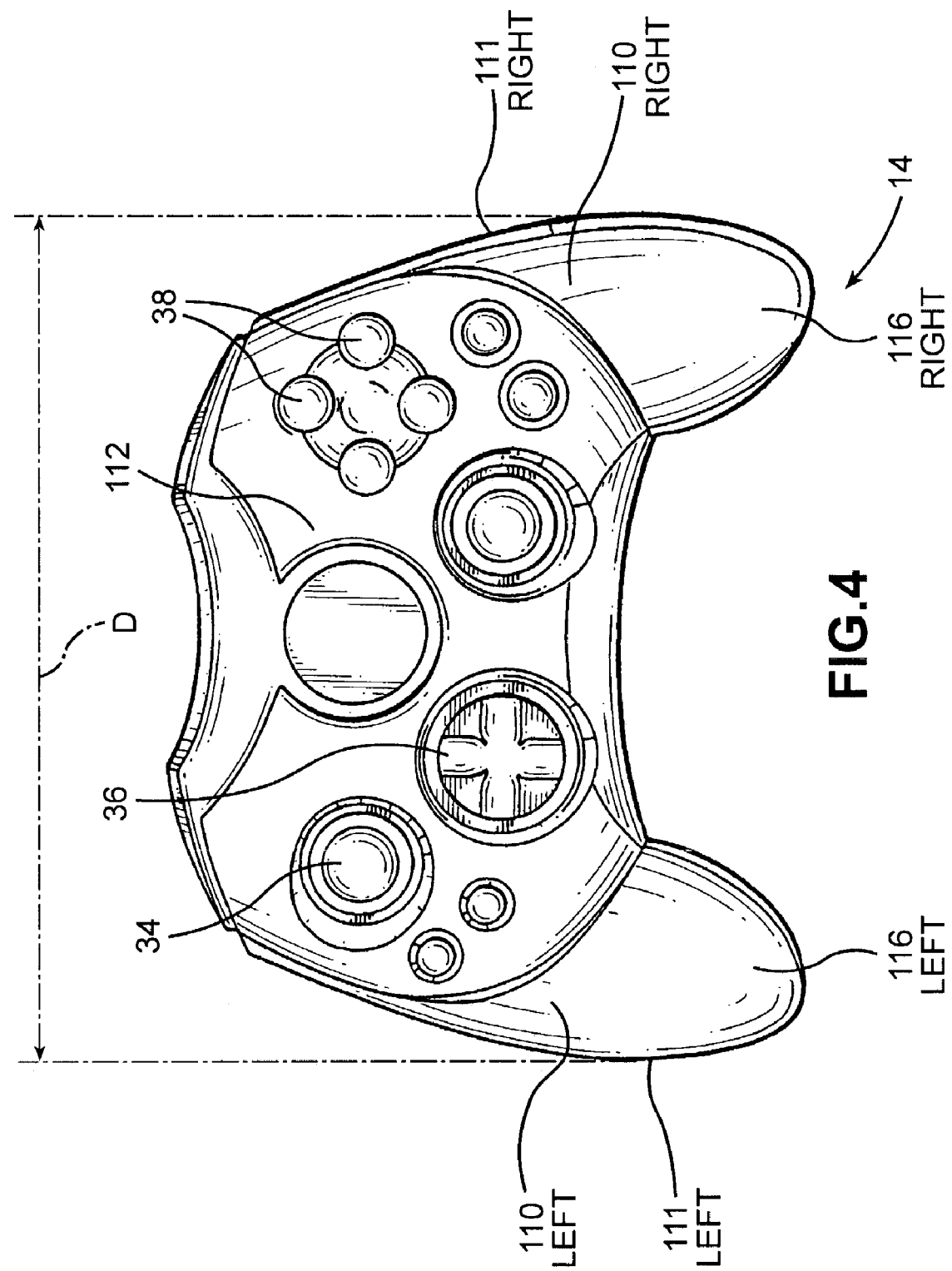
FIG. 4 is a top plan view of an example game controller.
Figure 5:
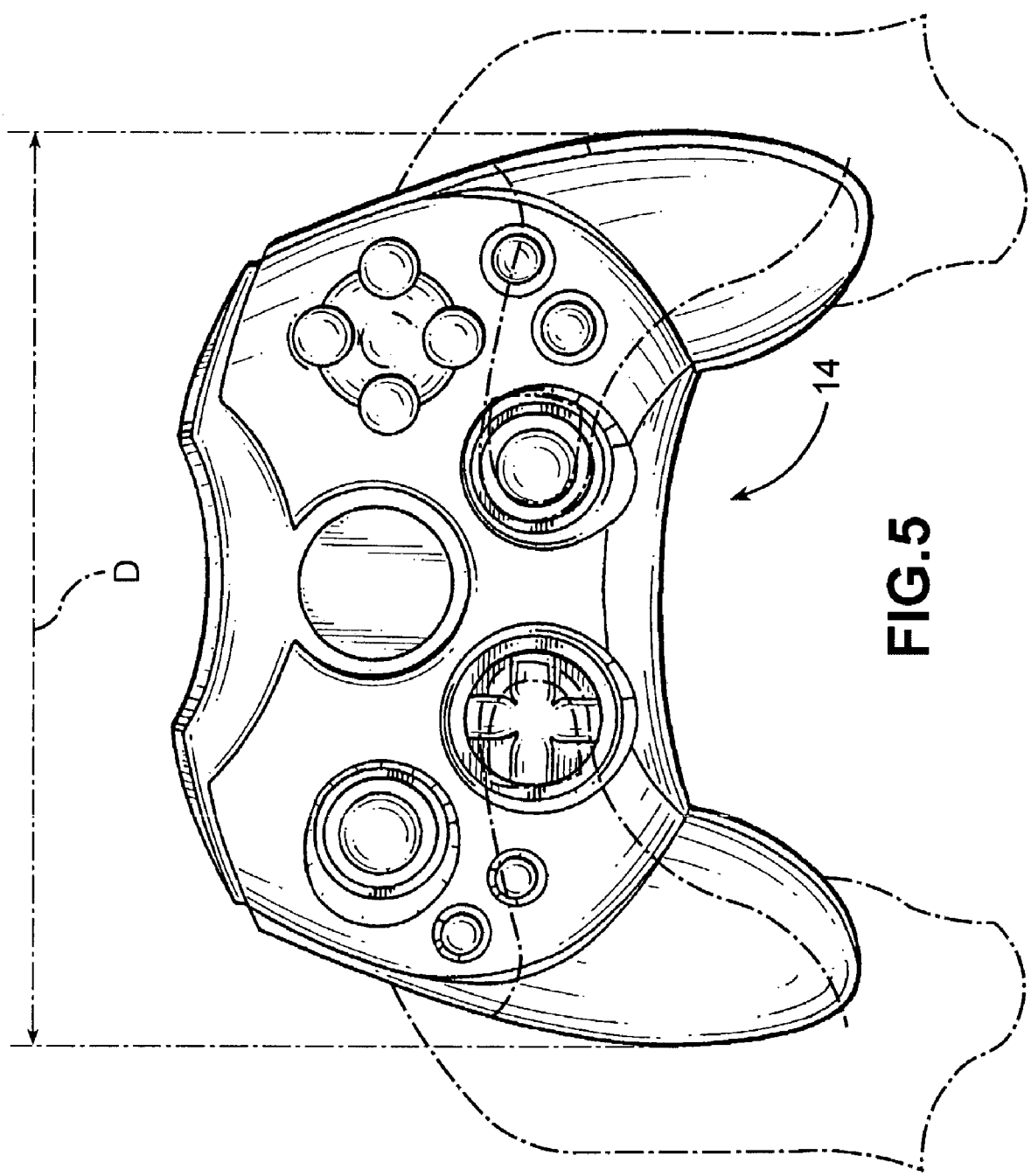
FIG. 5 is a top plan view of the game controller of FIG. 4, but with outlines of a player's hands to show movement of the game play controls.
Figure 6:
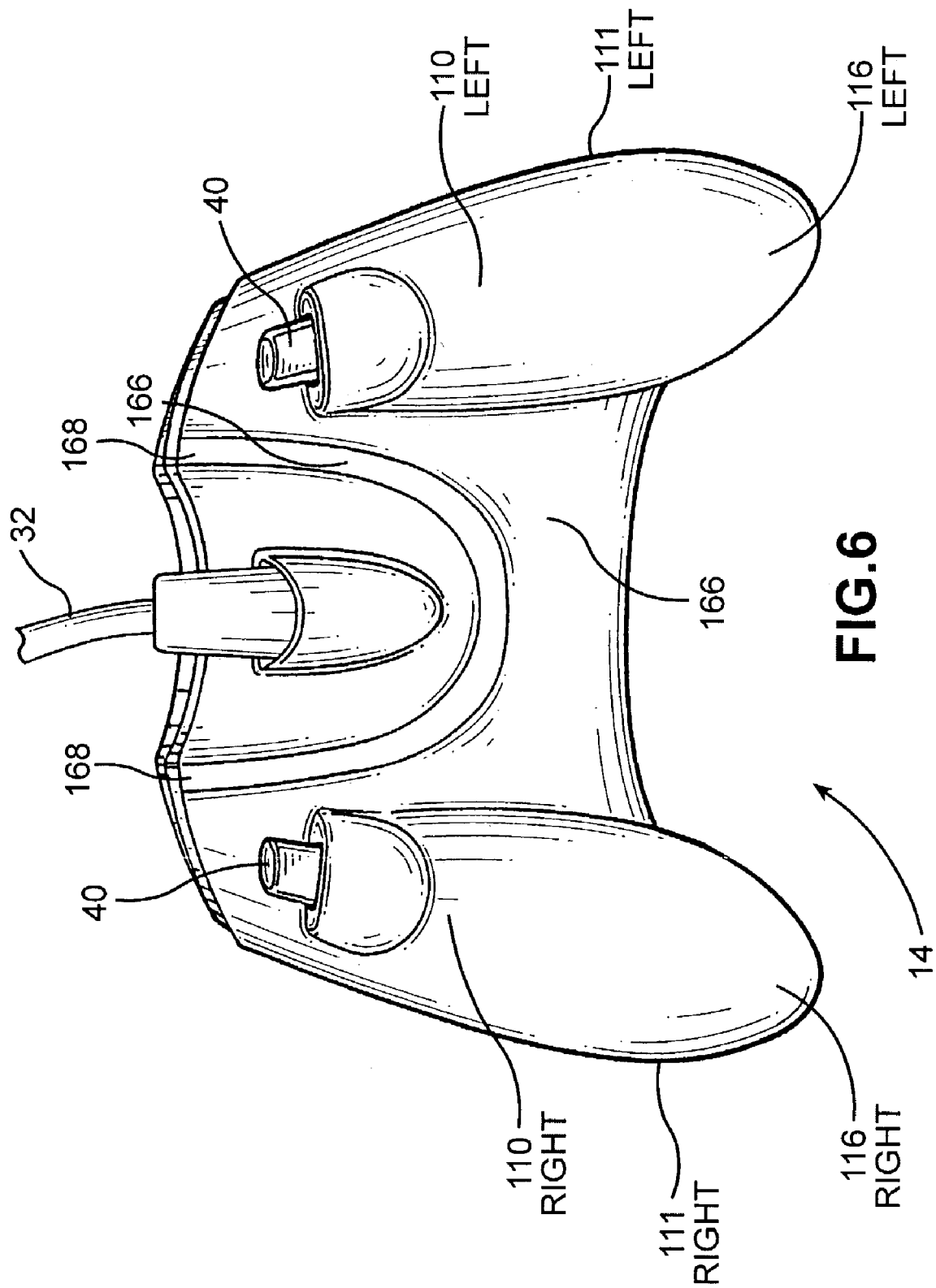
FIG. 6 is a bottom plan view of the game controller of FIG. 4.

FIG. 4 is a top view of one of the game controllers 14 from FIG. 1. As seen in FIG. 4, game controller 14 includes two grip portions $110_{LEFT}$, $110_{RIGHT}$ on either side of a main body portion 112. In use, a player typically holds left grip $110_{LEFT}$ such that the left edge $111_{LEFT}$ is in or near the palm of the user's left hand, and holds the right grip portion $110_{RIGHT}$ such that the right edge $111_{RIGHT}$ is in or near the palm of the user's right hand. In this fashion, and as shown in phantom lines in FIG. 5, the user can thereby access thumb sticks 34, D-pad 36 and buttons 38 with his or her thumbs, and can access triggers 40 (not shown in FIG. 5) with his or her index fingers. As seen in FIGS. 4 and 5, a user holding game controller 14 in both hands, in the game playing position and with both palms in full contact, will have his or her palms separated by a maximum distance of D. In a preferred embodiment, D is 7.5 inches or less. In another preferred embodiment, D does not exceed 6 inches. In still another preferred embodiment, D is between 5.63 and 6.38 inches. Because main body portion 112 only extends across the upper portion of game controller 14, there is an open region between the ends $116_{LEFT}$ and $116_{RIGHT}$ of grip portions $110_{LEFT}$ and $110_{RIGHT}$, and below main body portion 112. FIG. 6 is a bottom plan view of game controller 14, and shows the underside 166 of main body portion 112. Extending from the forward part of the main body portion is serial cable 32 which communicates with game console 12. In other embodiments, game controller 14 could communicate with game console 12 by wireless communication. For example, game controller 14 could communicate with game console 12 in accordance with the BLUETOOTH standard for wireless communications, as described in, e.g., "Specification of the Bluetooth System," version 1.1 (dated Feb. 22, 2001), available from Bluetooth SIG, Inc. at <http://www.bluetooth.com>.

Figure 7:
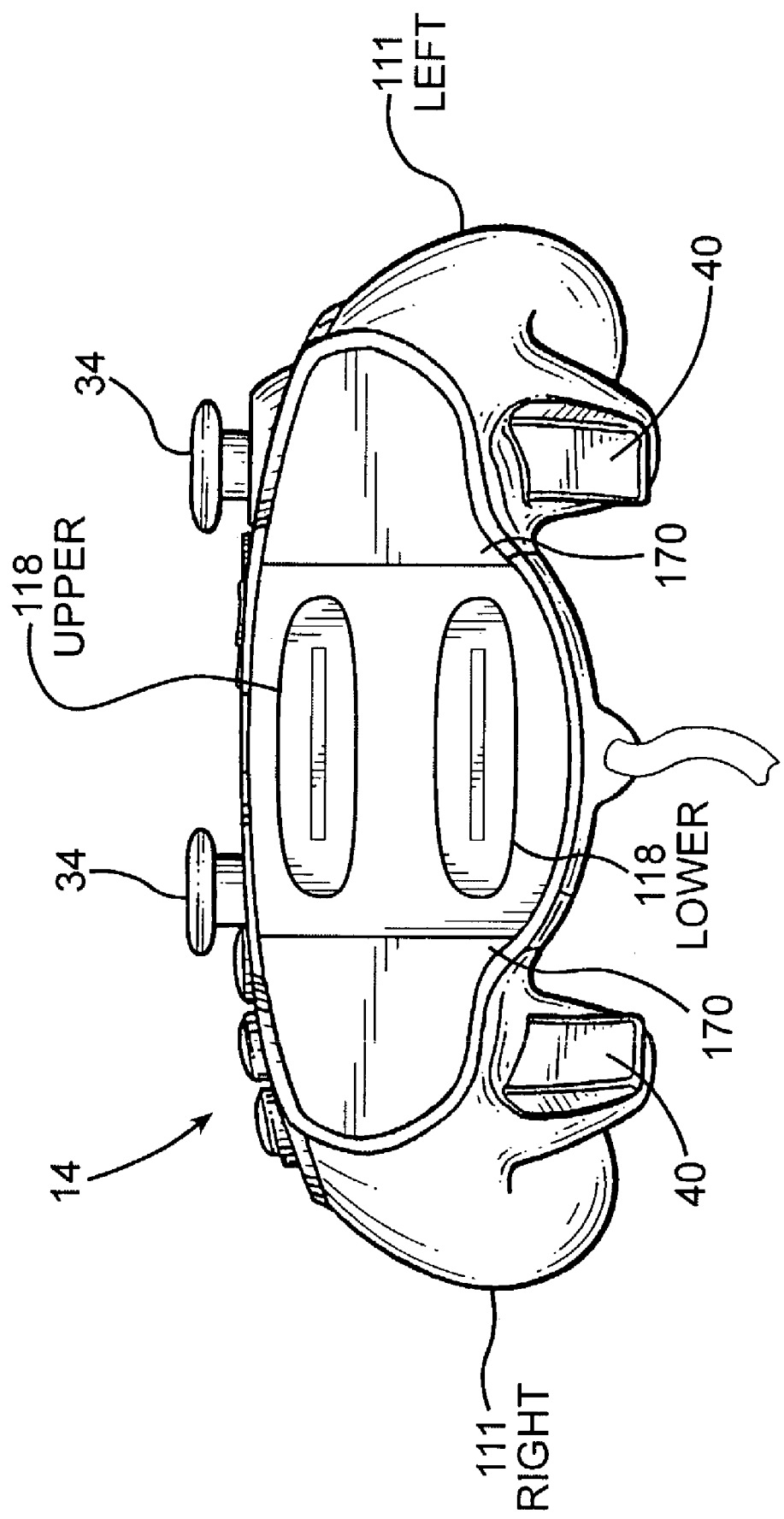
FIG. 7 is a front view of the game controller of FIG. 4.
Figure 8:
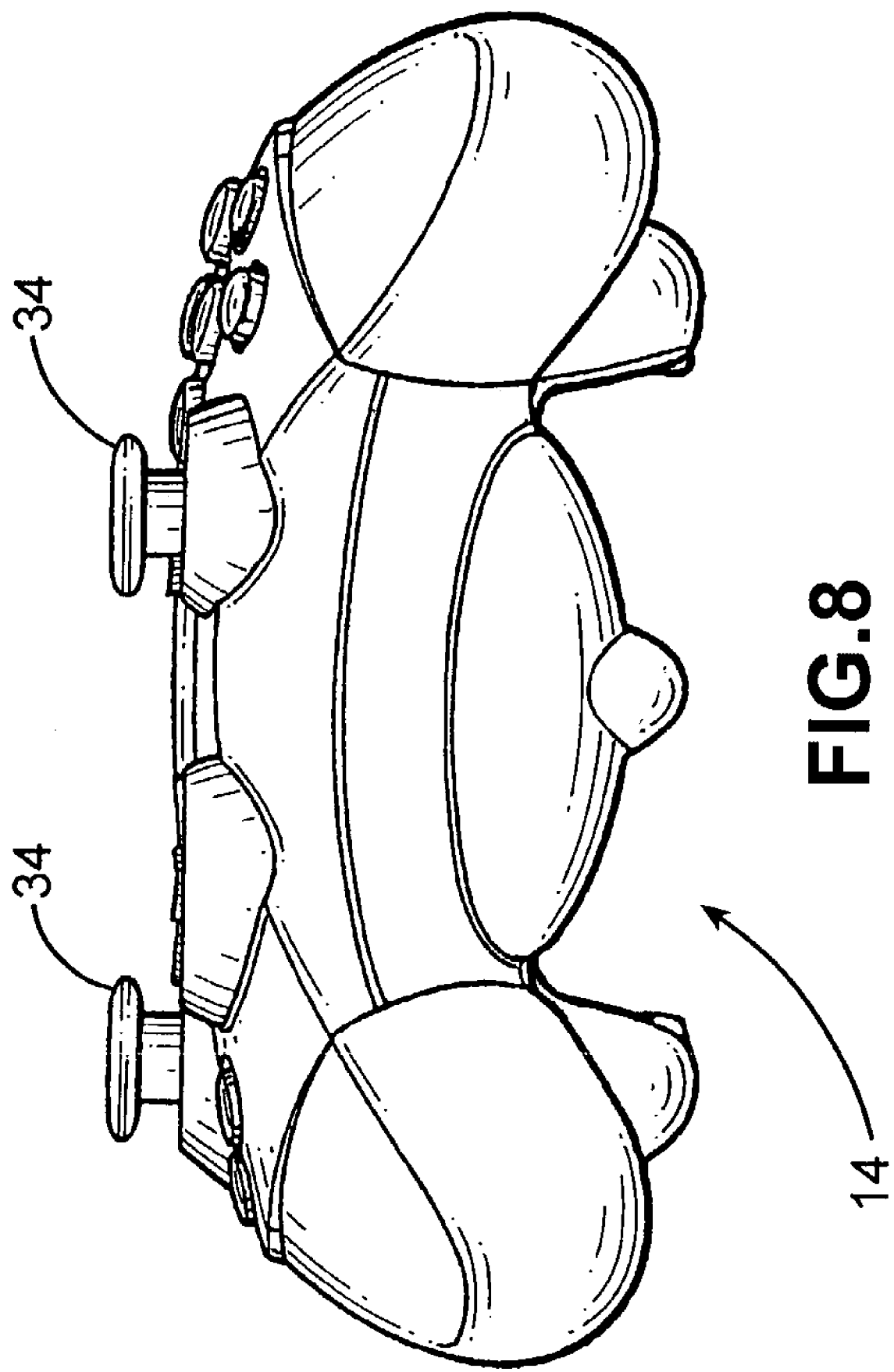
FIG. 8 is a rear (or player side) view of the game controller of FIG. 4.

FIG. 7 is a front view of game controller 14, and shows two connection ports $118_{UPPER}$ and $118_{LOWER}$. As previously discussed, connection ports 118 could be used for, e.g., insertion of one or more memory units 42. As another example, a connection port 118 could be used to connect a headset or other audio transmitter/receiver device. FIG. 8 is rear view of game controller 14, and shows the side of the game controller that would usually face the player when the controller is being used for game play.

Figure 9:
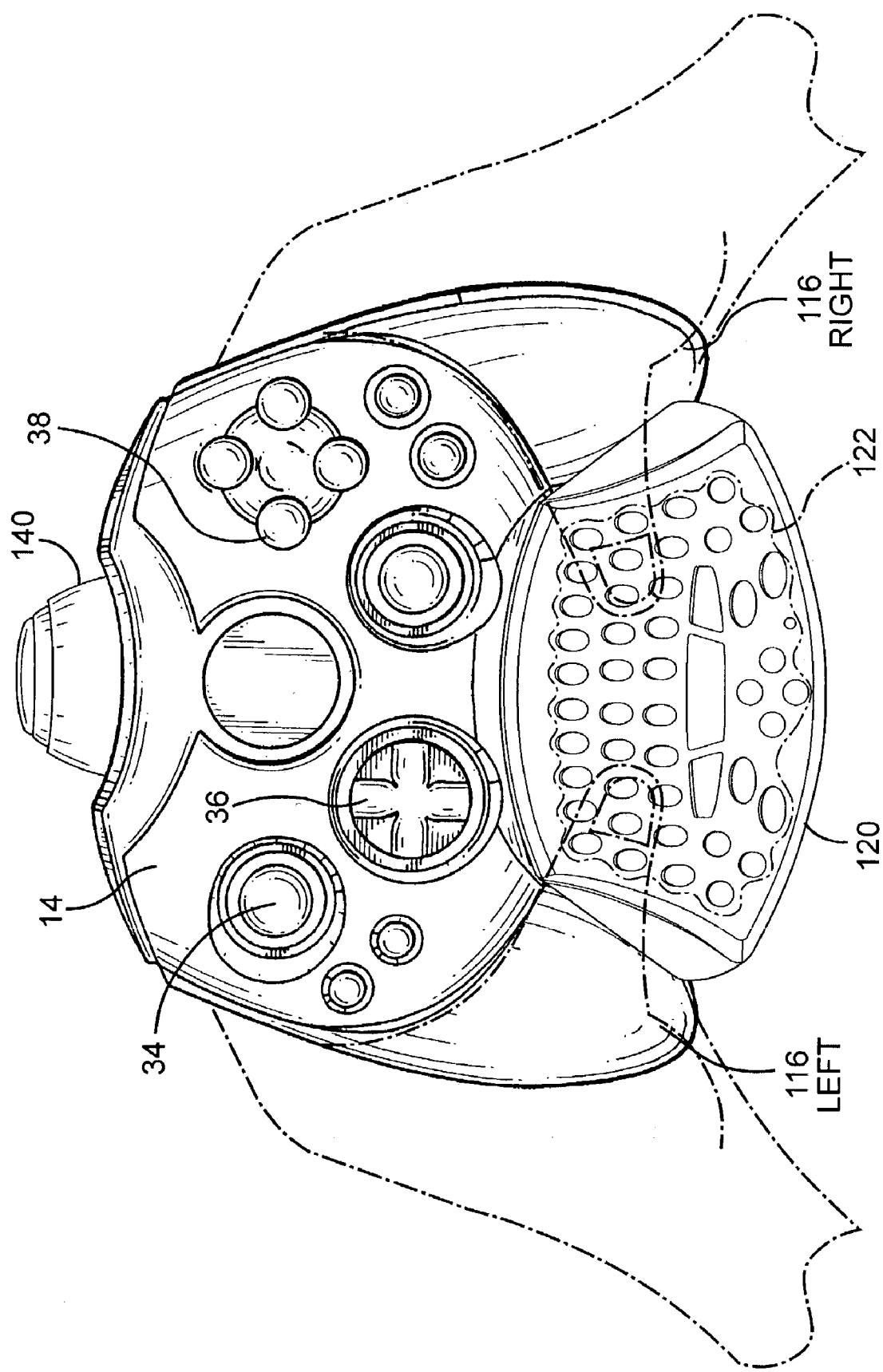
FIG. 9 is a top plan view of the game controller of FIG. 4, with an attached text input device, and with outlines of a player's hands to show input of text.

As shown in FIG. 9, text input device 120 can be attached to game controller 14 so as to fit in (or covering) the open region between grip ends 116. By locating text input device 120 in this area, a user can access keys 122 with his or her thumbs without substantially moving his or her hands from a game playing position (or with only a slight shift in the position of the grips in his or her hands), and without putting down game controller 14. More specifically, and as shown by the phantom line outlines of a user's hands, a user can easily reach any of the keys 122 on text input device 120 with one of his or her thumbs. A user can thereby quickly change from entering game play input via thumb sticks 34, D-pad 36, buttons 38 and/or triggers 40 to entering text via keys 122, and then quickly revert to providing game play input. A user could also control a game with one hand while entering text (or otherwise using text input device 120) with the other hand.

Figure 10:
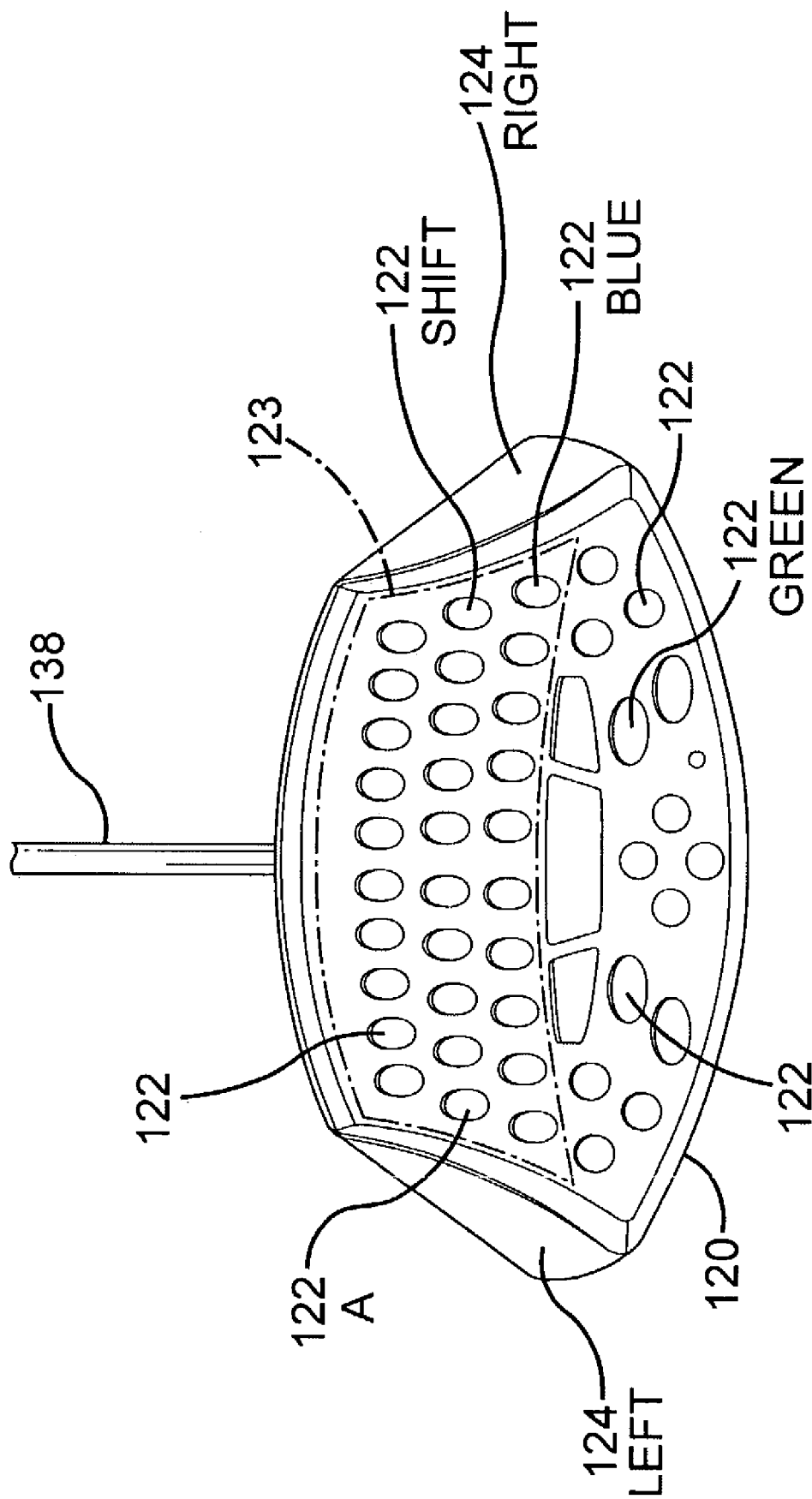
FIG. 10 is a top plan view of an example text input device.

FIG. 10 is a top view of text input device 120. Text input device 120 includes multiple rows of keys 122. In one preferred embodiment, all of keys 122 are single position buttons. In other words, each key 122 only has two states: pressed and not pressed. This is distinguished from a D-pad, rocker switch or other control mechanism that may have more than two states, e.g., a first or not pressed state, a second state where the control is pressed in a first position (or direction), a third state where the control is pressed in a second position (or direction), etc. In that embodiment, the majority of keys 122 are arranged in a single array 123 (outlined) having 3 rows and 10 columns. The columns and/or rows of the array may be curved, straight or in combinations of curved and straight formations. The curves may face in any direction. For example, the curved rows may curve downward in a "frown" (as shown), or may curve upward in a "smile."

Many of keys 122 correspond to a specific letter or other text character. The specific character may be marked on the key or in close proximity thereto. Some keys may, similar to a standard keyboard, correspond to multiple characters. For example, pressing key $122_A$ alone could generate a lower case "a," while pressing key $122_{SHIFT}$ and key $122_A$ in sequence could generate an upper case "A." So as to reduce the number of required keys, other key combinations can be used to add further characters to a key. For example, a second character may be printed on many of keys 122 in a second color, and a separate key pressed to generate the character printed in that second color. Referring to key $122_A$, a forward slash ("/") is printed above the "A," but in blue. Key $122_{BLUE}$ has a blue spot printed on its surface. By pressing and holding key $122_{BLUE}$ and then key $122_A$, a forward slash is generated. Similarly, a third character could be printed on or near a key in a third color, and another key pressed to generate that third color character. Again using key $122_A$ as an example, a back slash is printed above key $122_A$ in green, and key $122_{GREEN}$ has a green spot on its surface. By pressing and holding key $122_{GREEN}$ and then pressing key $122_A$, a back slash is generated. Other keys may have specific functions assigned by a particular game program. For example, certain keys could, similar to the F1, F2, F3, etc. keys on a standard keyboard, each generate a specific signal that is interpreted differently by different game programs. Other keys could function similar to the arrow keys (↑, ↓, →, ←) on a standard keyboard and move a text cursor up, down, left or right within a block of text. Other keys could also function similar to keys on a standard keyboard such as the space bar, backspace key, "DEL" key, etc.

Text input device 120 could have more or less of keys 122 than shown. In a preferred embodiment, text input device 120 has a sufficient number of simultaneously-viewable keys to accommodate the most commonly-used characters of the intended language (i.e., the language of persons for whom the keyboard is primarily intended). In one preferred embodiment, text input device 120 has at least 26 simultaneously-viewable text keys. In a more preferred embodiment, each of those 26 text keys generates a letter of the alphabet in an individual key press (i.e., without requiring a shift or other key combination). In other embodiments, text input device 120 may have between 20 and 30 simultaneously-viewable text keys. In still other embodiments, text input device 120 could have over 30 simultaneously-viewable text keys.

Extending laterally from either side of text input device 122 are conformal wings $124_{LEFT}$ and $124_{RIGHT}$. As described in more detail below, wings 124 may in some embodiments cooperate with a portion of the game controller 14 to hold the text input device 120 firmly in place.

Figure 11:
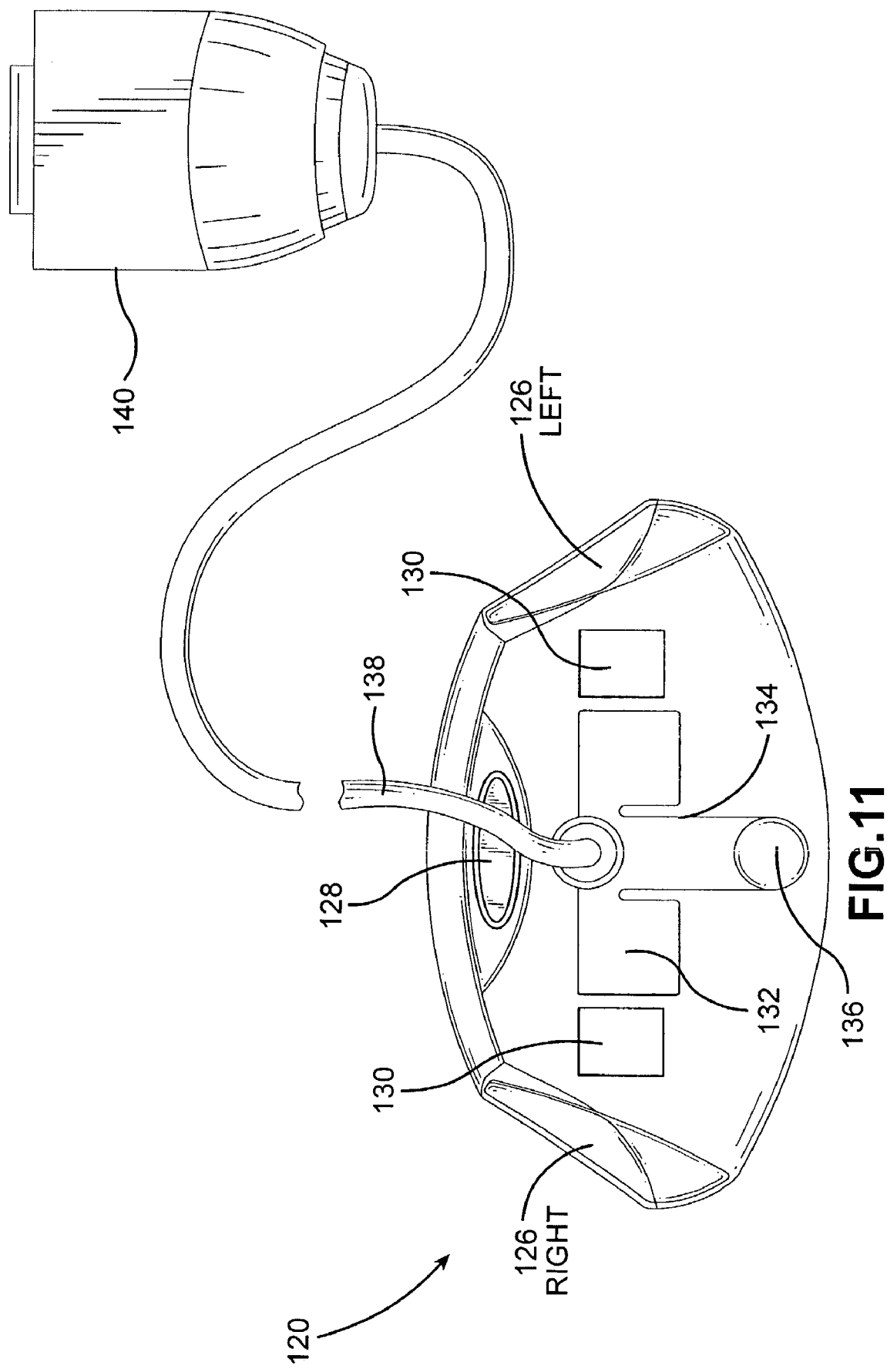
FIG. 11 is a bottom plan view of the text input device of FIG. 10.

FIG. 11 is a bottom view of text input device 120. Undersides $126_{LEFT}$ and $126_{RIGHT}$ can be shaped to conform to the surface contour(s) of portions of a game controller. In one preferred embodiment, undersides $126_{LEFT}$ and $126_{RIGHT}$ have shapes substantially conforming to the outer surfaces of portions of grip ends 116 on which wings 124 rest when text input device 120 is attached to game controller 14. Wings $124_{LEFT}$ and $124_{RIGHT}$ may have rubber or some other compressible, high-friction material on the undersides $126_{LEFT}$ and $126_{RIGHT}$ of wings 124. Such a material could compress slightly when text input device 120 is installed on game controller 14, thereby minimizing the effects of any size tolerances or manufacturing defects. Such a material could also, by increasing friction between the wing undersides 126 and the game controller 14, prevent the text input device from slipping from position. A cheek area 128 could also be covered with rubber or other rubber-like material. In one embodiment, the rubber material covering undersides $126_{LEFT}$ and $126_{RIGHT}$ and cheek area 128 is a rubber-like thermoplastic elastomer such as SANTOPRENE (available from Advanced Elastomer Systems of Akron, Ohio.). Located inboard of the wings on the bottom side of text input device 120 are retaining slots 130. Located between slots 130 is a cover plate 132, the center portion of which forms a tongue 134. Located at the end of tongue 134 is a retaining button 136. Because of the elasticity of tongue 134, button 136 can be pressed in, but is then biased outward to its original position. Also emanating from the underside of text input device 120 is a connecting cable 138 having a connector 140 at the end.

Figure 12:
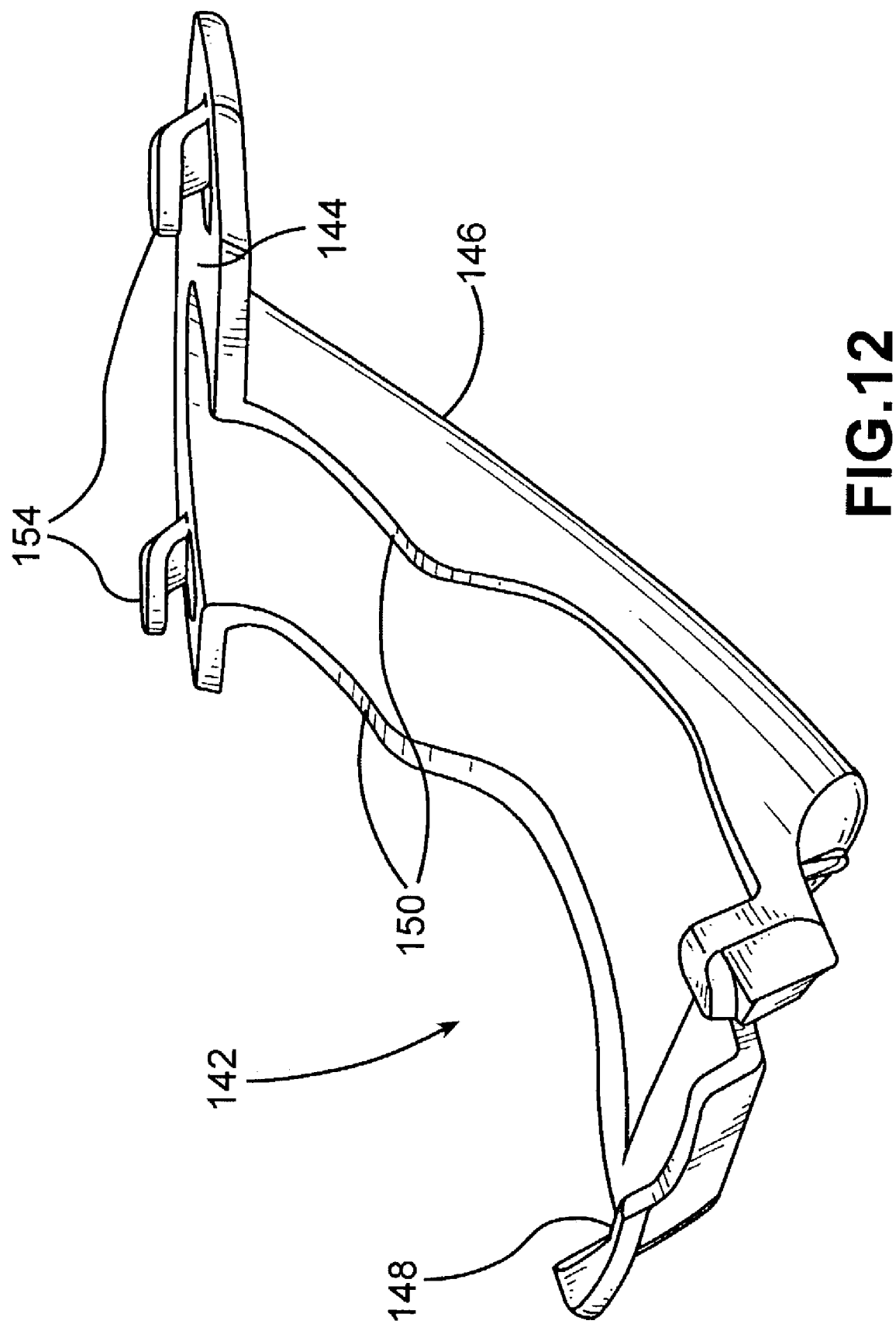
FIG. 12 is a perspective view of an attachment bracket according to one embodiment of the invention.
Figure 13:
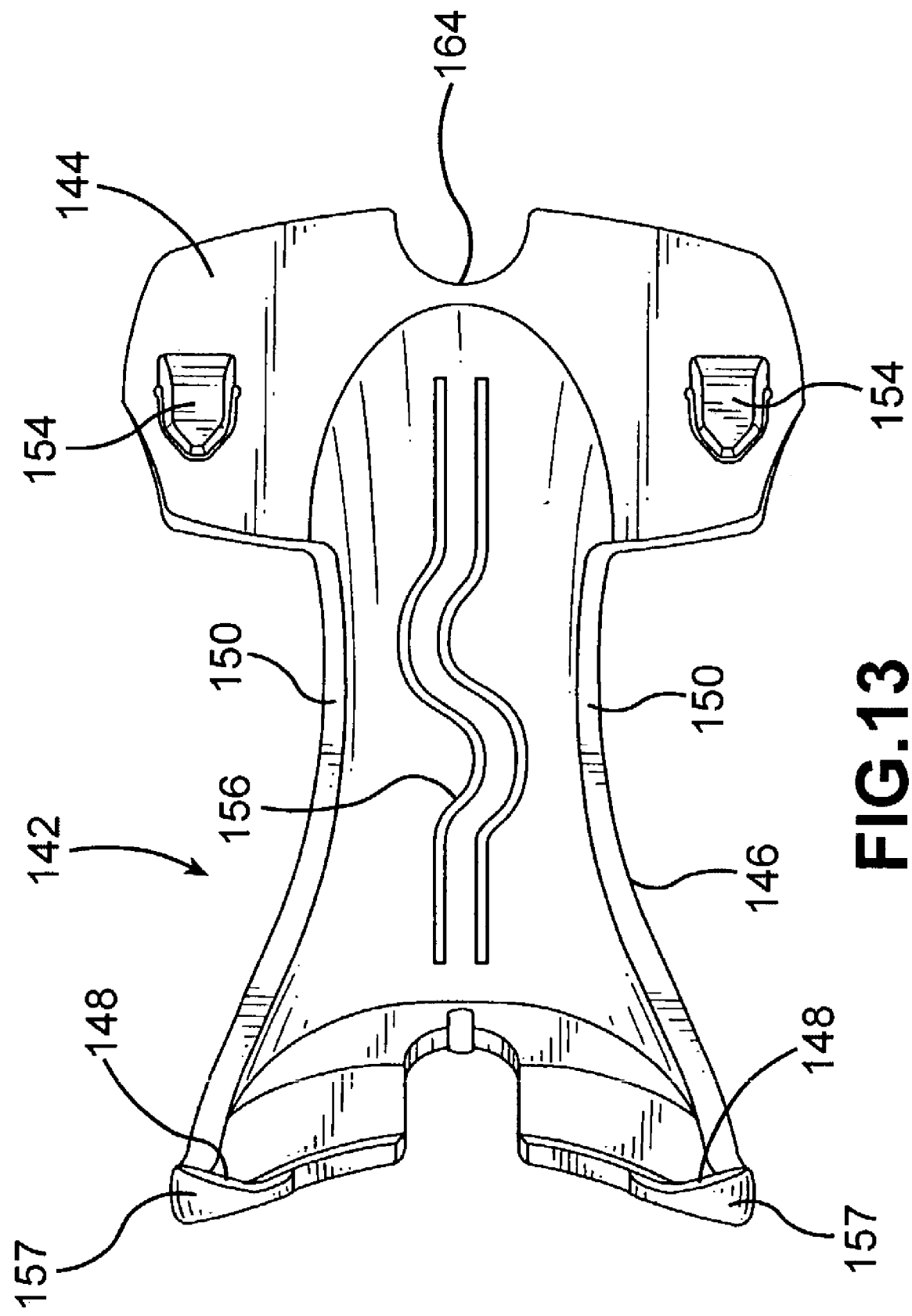
FIG. 13 is a top plan view of the bracket of FIG. 12.
Figure 14:
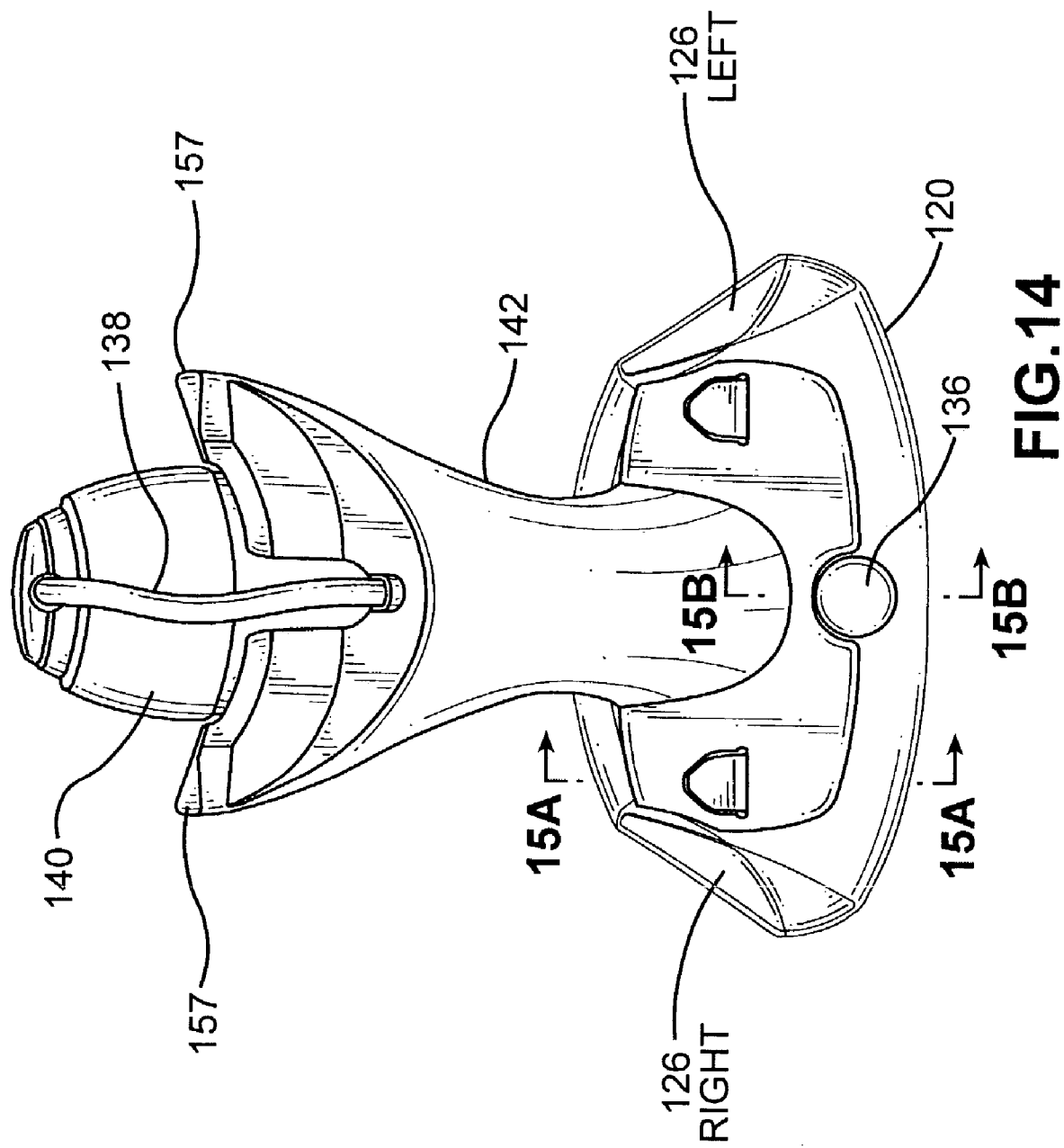
FIG. 14 is a bottom plan view of the bracket of FIG. 12 attached to the text input device of FIG. 10.

FIG. 12 is a perspective view of an attachment bracket 142. Attachment bracket 142 includes an attachment plate 144, a connecting arm 146, and retaining shoulders 148. Connecting arm 146 has a "U-shaped" cross section and contoured edges 150. Located on either side of attachment plate 144 and extending above the surface 152 of attachment plate 144 are clips 154. FIG. 13 is a top plan view of bracket 142, and shows the interior of arm 146. Located at the bottom of arm 146 is a cable retaining groove 156, the operation of which is described below. FIG. 14 is a bottom plan view of bracket 142 when attached to text input device 120. As seen in FIG. 14 and in FIG. 15A, a cross section taken along lines 15A-15A of FIG. 14, clips 154 fit upward into slots 130. As bracket 142 is then moved toward the front 158 of text input device 120, the interior portions 160 of clips 154 contact and hold the forward lip 162 of each slot 130. When attachment plate 144 is fully forward, button 136 is biased outward into a circular cutout 164 in attachment plate 144, as seen in FIG. 15B (a cross section taken along lines 15B-15B of FIG. 14). In this manner, attachment plate 144 cannot be removed from text input device 120 without first pressing button 136 inward. In other embodiments, button 136 could be omitted. In such an embodiment, bracket 142 could retain text input device 120 by the pinching action of clip 154 on the portion of lower case 180 that is proximate to lip 162. In such an embodiment, circular cutout 164 could also be omitted. Alternatively, the general region of attachment plate 144 in which circular cutout 164 is located could be slotted or grooved to accommodate protrusions on the bottom of text input device 120.

In use, arm 146 of bracket 142 acts a flexible beam to hold text input device 120 in place. In particular, attachment plate 144 is first attached to text input device 120 as described above. Next, undersides 126 of wings 124 are placed in contact with grip ends 116, and the cheek portion 128 is placed in contact with a lower portion of main body portion 112. Arm 146 is then bowed slightly outward. In other words, the ends of arm 146 are moved in the direction opposite to that in which the tips of the "U" of the arm cross-section point, while the middle of arm 146 is moved slightly in the opposite direction. As it is being bowed, the retaining shoulders 148 slip over and contact the lower edge of front 170. The elasticity of the arm 146 then causes the inside faces of the shoulders 148 to be pressed against the lower edge of front 170, while the undersides 126 of wings 124 are pulled into contact with grip ends 116 (and cheek portion 128 is pulled into contact with main body portion 112). In this manner, text input device 120 can be attached to game controller 14 without cutting into or otherwise modifying the outer housing of game controller 14.

Figure 16:
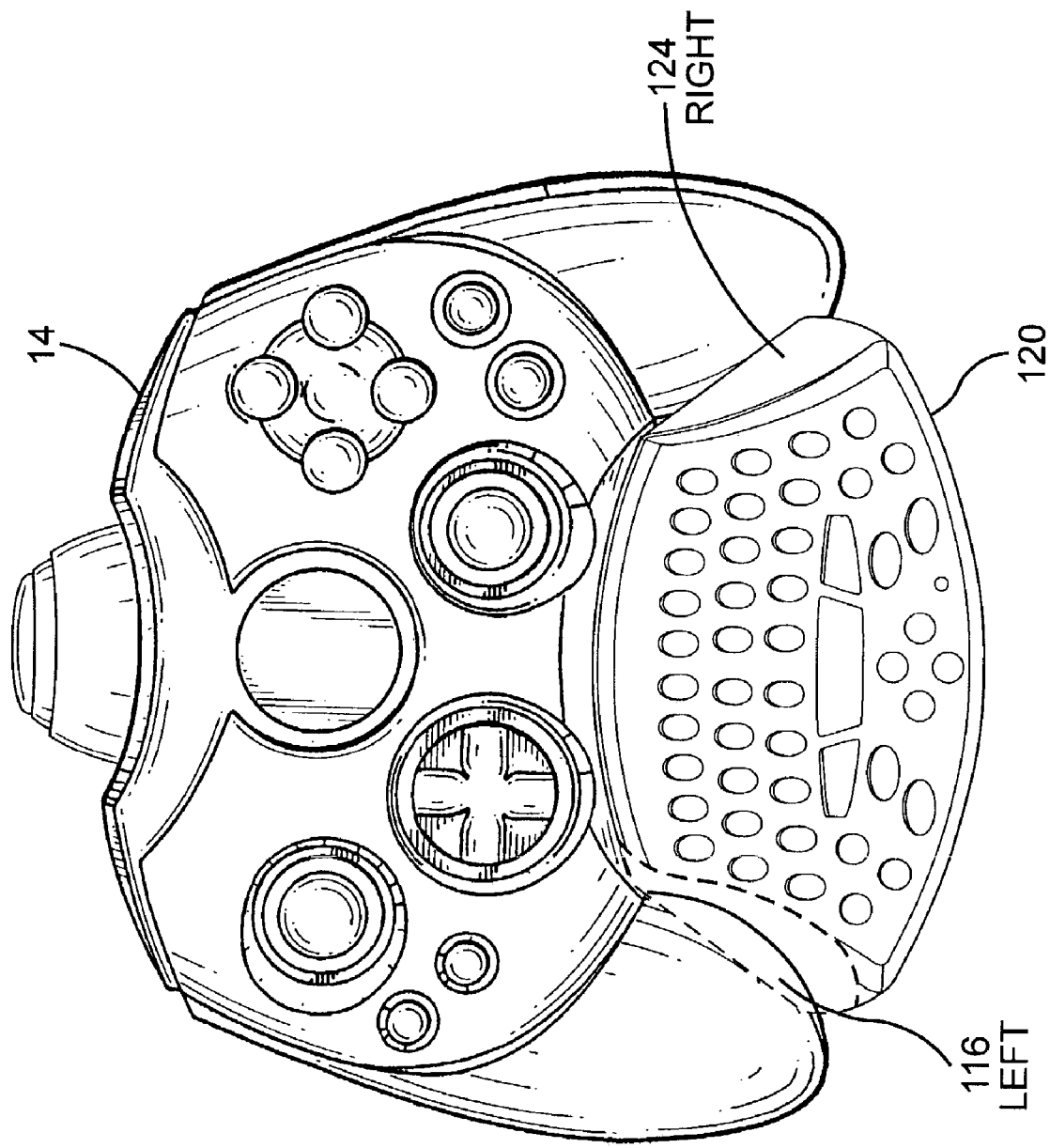
FIG. 16 is a top plan view of the game controller of FIG. 4 with attached text input device of FIG. 10, with a portion of the text input device removed.
Figure 17:
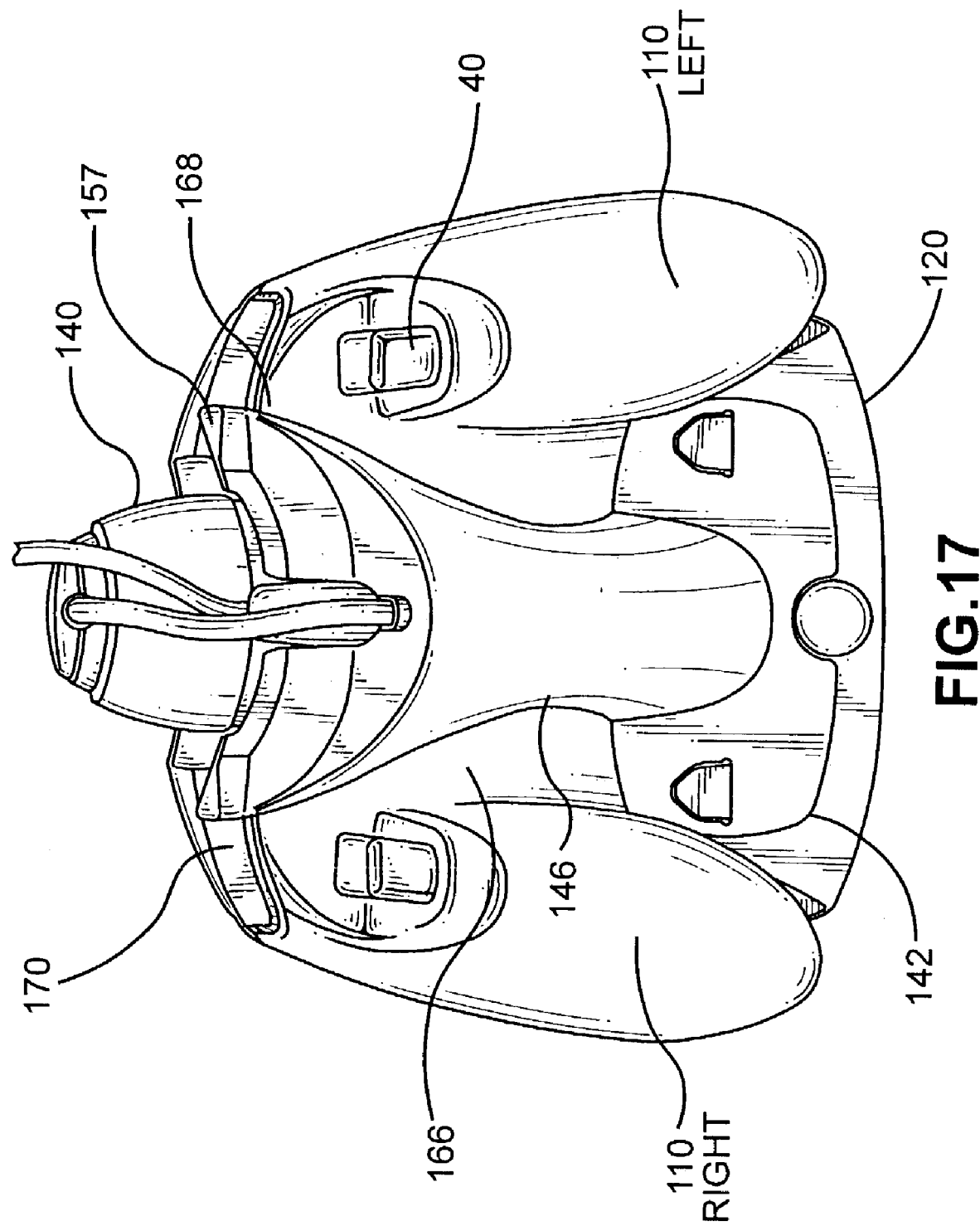
FIG. 17 is a bottom plan view of the game controller of FIG. 4 with attached text input device of FIG. 10 and bracket of FIG. 12.
Figure 18:
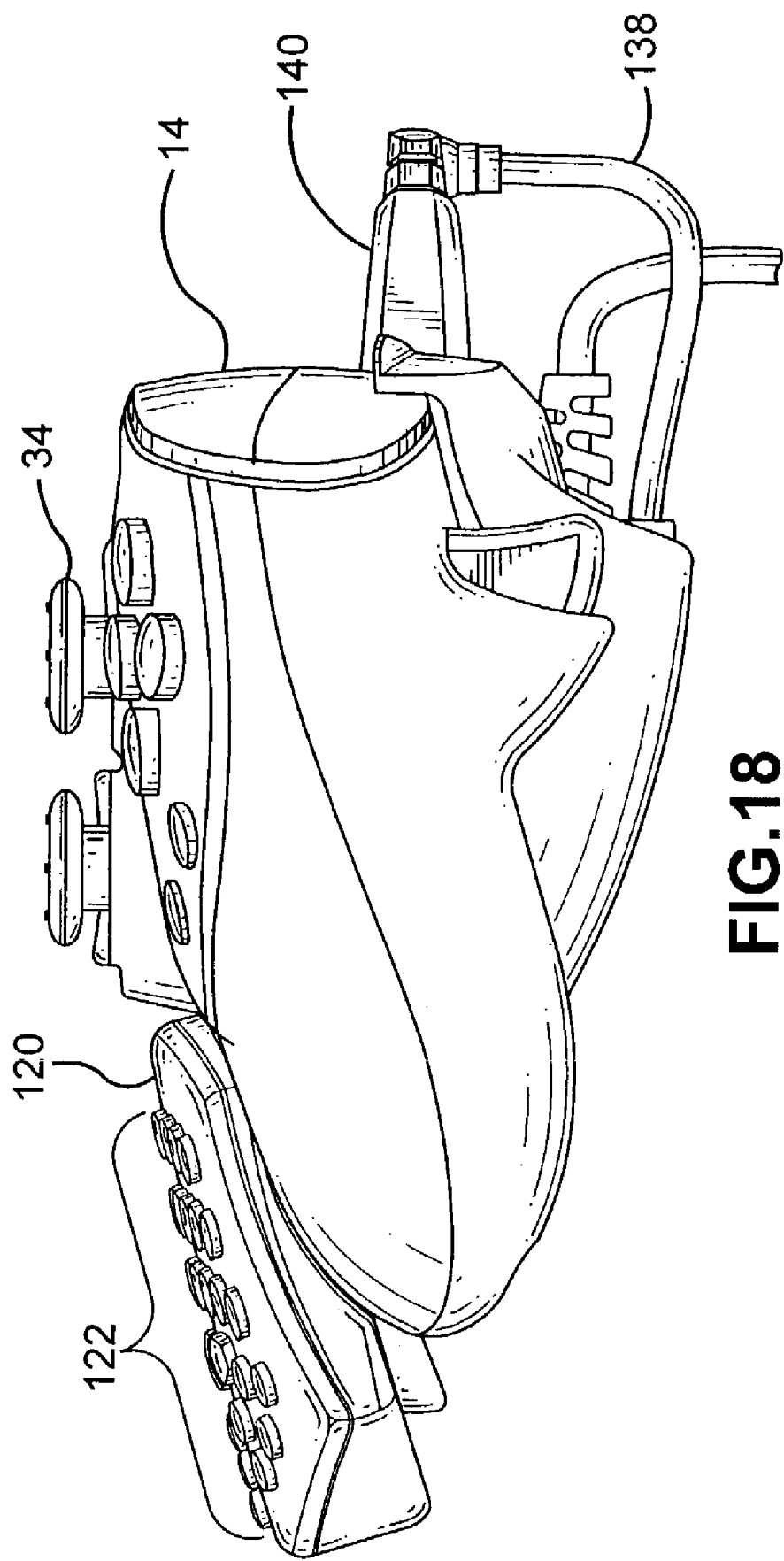
FIG. 18 is a side view of the game controller of FIG. 4 with attached text input device of FIG. 10 and bracket of FIG. 12.

FIGS. 16-18 show installation of text input device 120 on game controller 14. FIG. 16 is a top plan view of game controller 14 with text input device 120 attached. The left side of text input device 120 has been removed, with the outline shown in broken lines, to further illustrate the attachment. Wings 124 of text input device 120 extend over the interior portions of grip ends 116. The undersides 126 of wings 124 conform to and rest upon the outer upper surfaces of grip ends 116, and cheek portion 128 of the underside of text input device 120 rests upon the lower part of main body portion 112. FIG. 17 is a bottom plan view of game controller 14 with text input device 120 and bracket 142 attached, and further shows that the undersides 126 of wings 124 are covered by grip ends 116. Arm 146 of bracket 142 extends to the front of main body portion 112, with the upper edges 150 of arm 146 (see FIG. 12) conforming to the underside 166 of main body portion 112. Retaining shoulders 148 wrap over the bottom edge 168 of main body portion 112 and extend over the front 170 of game controller 14. In this manner, bracket 142 holds text input device 120 against the top surfaces of main body portion 112 and grips 110. Connector 140 plugs into one of ports 118 (FIG. 7). FIG. 18 is a side view of game controller 14 with installed text input device 120, and further shows cooperation of the various components.

As seen in FIGS. 12-14 and 17, a pair of tabs 157 extend from the retaining shoulders 148 of bracket 142. Tabs 157 allow convenient removal of bracket 142 (and attached text input device 120) from game controller 14. By pushing downward on tabs 157 from the top side of game controller 14, bracket 142 can be disengaged from game controller 14.

Figure 19:
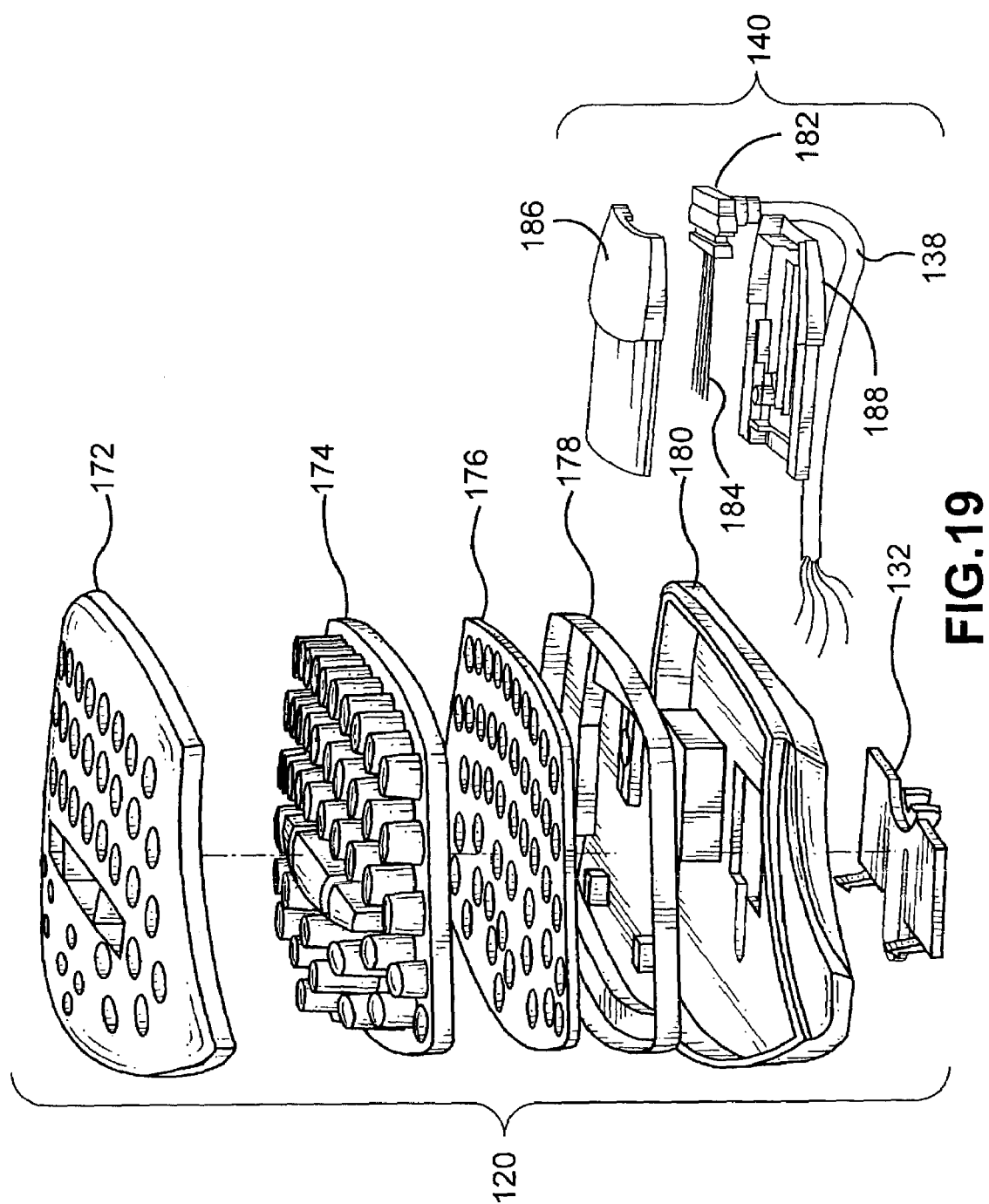
FIG. 19 is an exploded perspective view of the text input device of FIG. 10.

FIG. 19 is an exploded perspective view of text input device 120. Text input device 120 includes an upper case 172, a set of keys 174, printed circuit board 176, an electrostatic discharge shield 178, and a lower case 180. The box-like structure to the side of the opening in lower case 180 covers (or partially covers) a retaining slot 130. So as not to obscure the drawing, a similar box-like structure on the opposite side of the opening is not shown. In one embodiment, keys 174 are molded from silicone rubber, and form inverted domes which, when pushed downward, close membrane or metal dome switches (not shown) located on printed circuit board 176. Located on the underside of printed circuit board 176 (also not shown) are various electronic components which cause appropriate text character codes to be generated when various of keys 122 are pressed. The design of circuits and components for such purposes is known in the art, and thus not further described herein. Any suitable components for generating text character codes in response to key presses can be implemented.

Also shown in FIG. 19 is an exploded view of connector 140. Cable 138 terminates in a right angle fitting 182. In particular, fitting 182 causes cable 138 to exit from connector 140 in a direction that is substantially perpendicular to the direction in which connector 140 is inserted into port 118. Extending from fitting 182 are multiple contacts 184. When connector 140 is inserted into port 118, contacts 184 form electrical connections with corresponding contacts inside of port 118. Upper and lower connector housings 186 and 188, when attached to one another, capture and retain fitting 182. By use of right angle fitting 182, a shorter cable may be used to connect text input device 120 to game controller 14. Right angle fitting 182 further avoids a loop of cable 138 extending beyond the end of connector 140 and then wrapping back around into connector 140. In other embodiments, a fitting causing cable 138 to exit connector 140 at other angles could be used.

Figure 20:
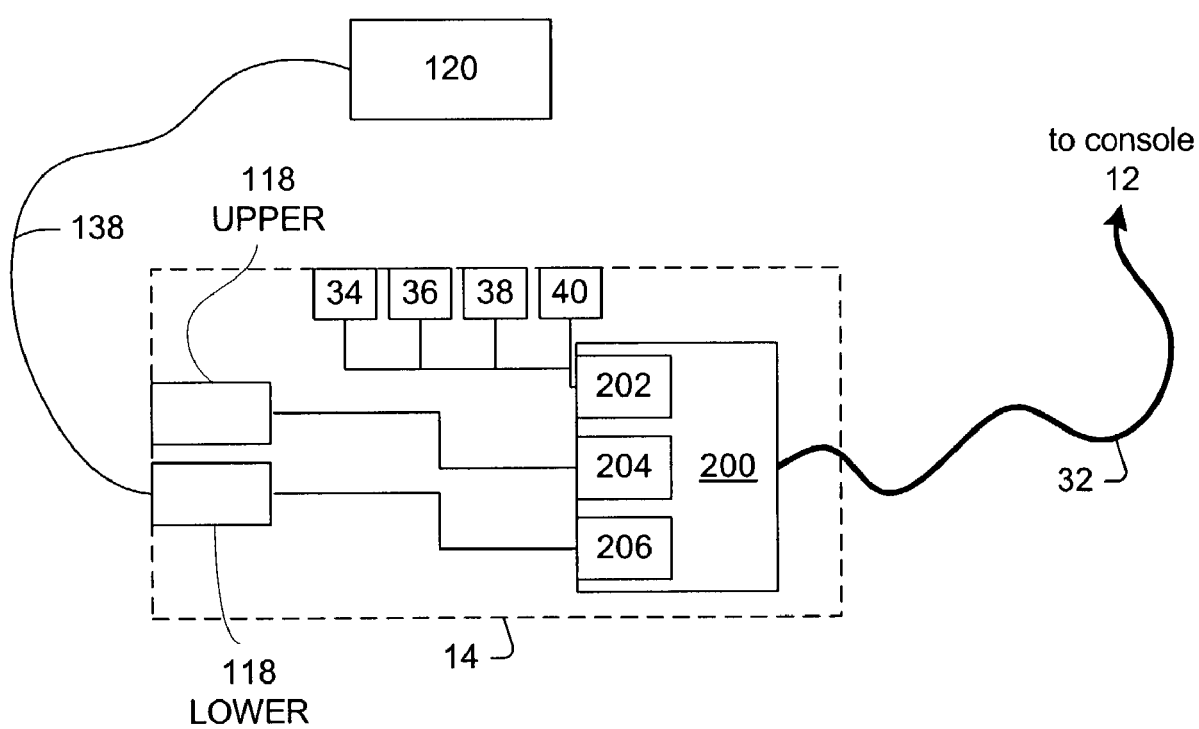
FIG. 20 is a block diagram of a game controller and text input device according to one embodiment of the invention.
Figure 21:
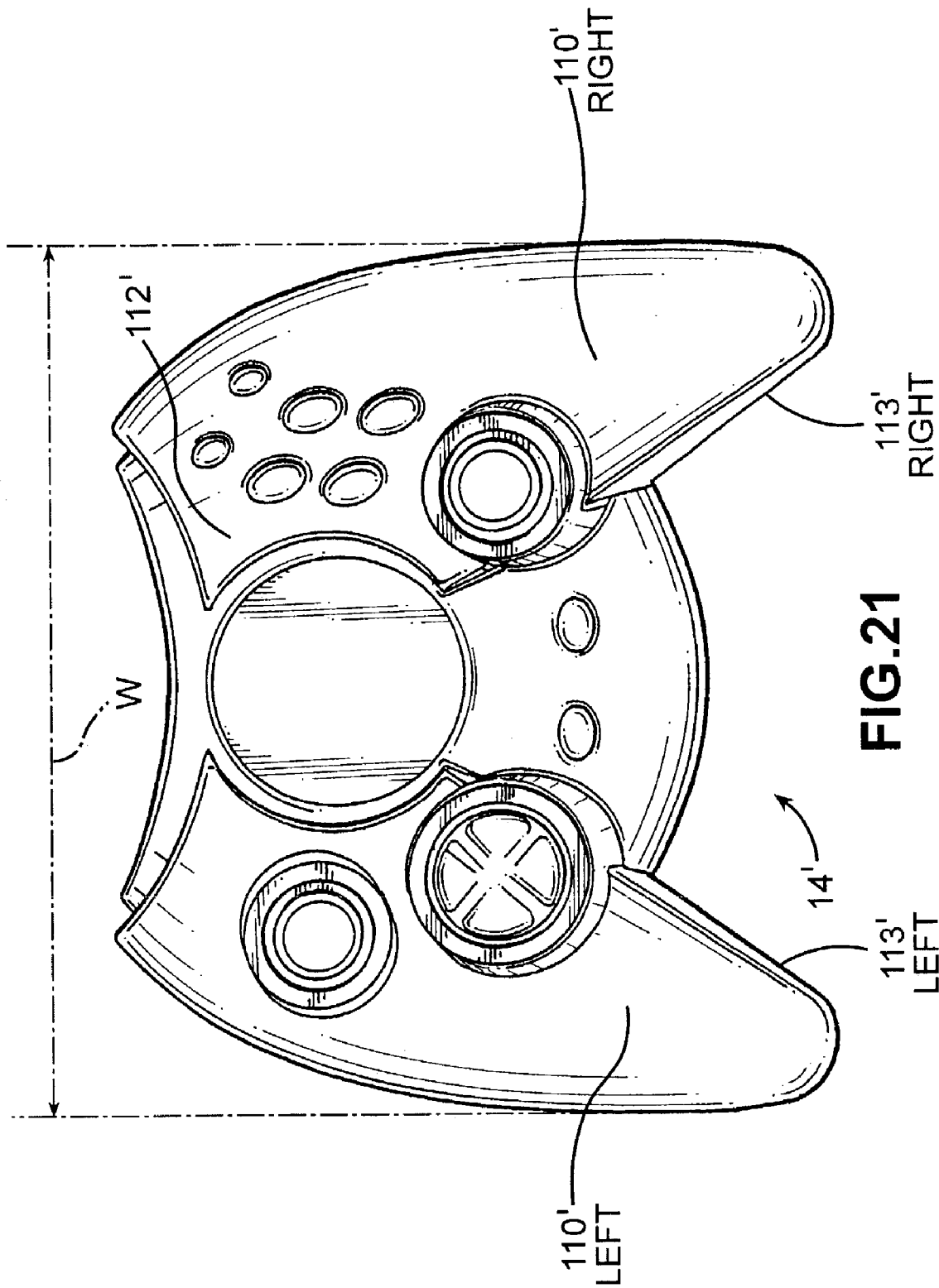
FIG. 21 is a top plan view of a second example game controller.
Figure 22:
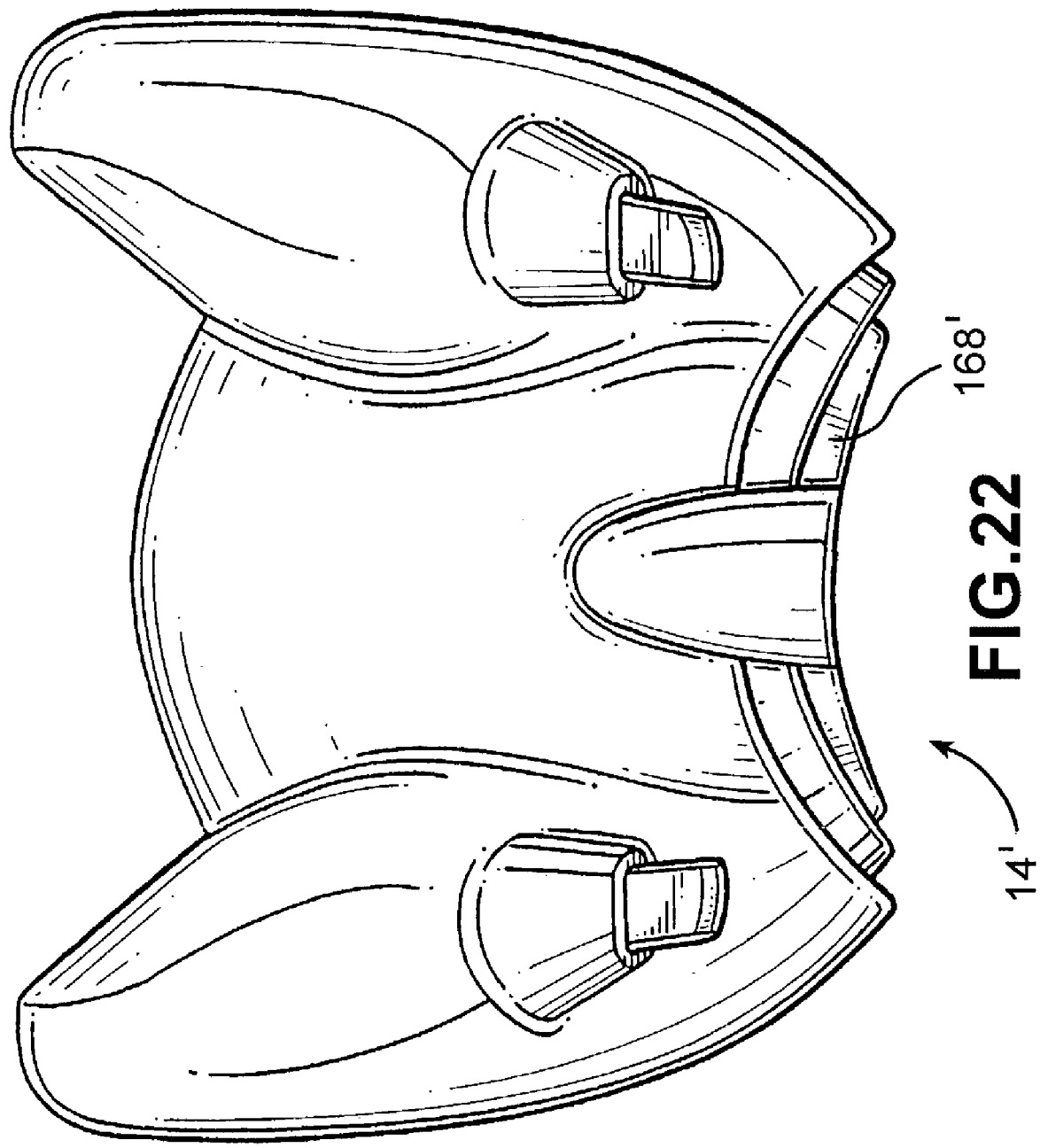
FIG. 22 is a bottom plan view of the game controller of FIG. 21.

FIG. 20 is a block diagram of text input device 120 and game controller 14. In a preferred embodiment, game controller 14 contains a USB hub 200 with multiple ports 202, 204 and 206. One of those ports (202) is connected to thumb sticks 34, D-pad 36, buttons 38 and triggers 40, and is used for communicating game input to game console 12. The remaining ports 204 and 206 correspond to connection ports $118_{UPPER}$ and $118_{LOWER}$ (FIG. 7), and are available for a variety of purposes, such as the aforementioned memory units 42 or a headset. In a preferred embodiment, text input device 120 connects to one of those ports. When so connected, game controller 14 and text input device 120 are recognized by game console 12 as two separate USB devices. In this manner, it is thus possible for a user to alternate between game play input with game controller 14 and text input with text input device 120 without having to actuate a mode selection switch each time the user alternates from one to the other. In other words, the game play controls of the game controller provide output recognized as game play input without requiring a separate signal to indicate whether game controller output should be regarded as text or game play input. Similarly, text keys of the text input device provide output recognized as text input without requiring a separate signal to indicate whether the text input device output should be regarded as text input or game play input. Similarly; it is not necessary to provide a "controller off/text input on" switch to go from use of the game controller to use of the text input device, or to provide a "controller on/text input off" switch to go from use of the text input device to use of the game controller. The operation of multiple USB devices by a computer is known in the art, and is described in Universal Serial Bus Specification Revision 2.0 (Apr. 27, 2000), available from USB Implementers Forum, Inc. at <http://www.usb.org/home>.

According to another aspect of the invention, a single text input device can be manufactured for attachment to different types of game controllers. Respectively shown in FIGS.

Figure 25:
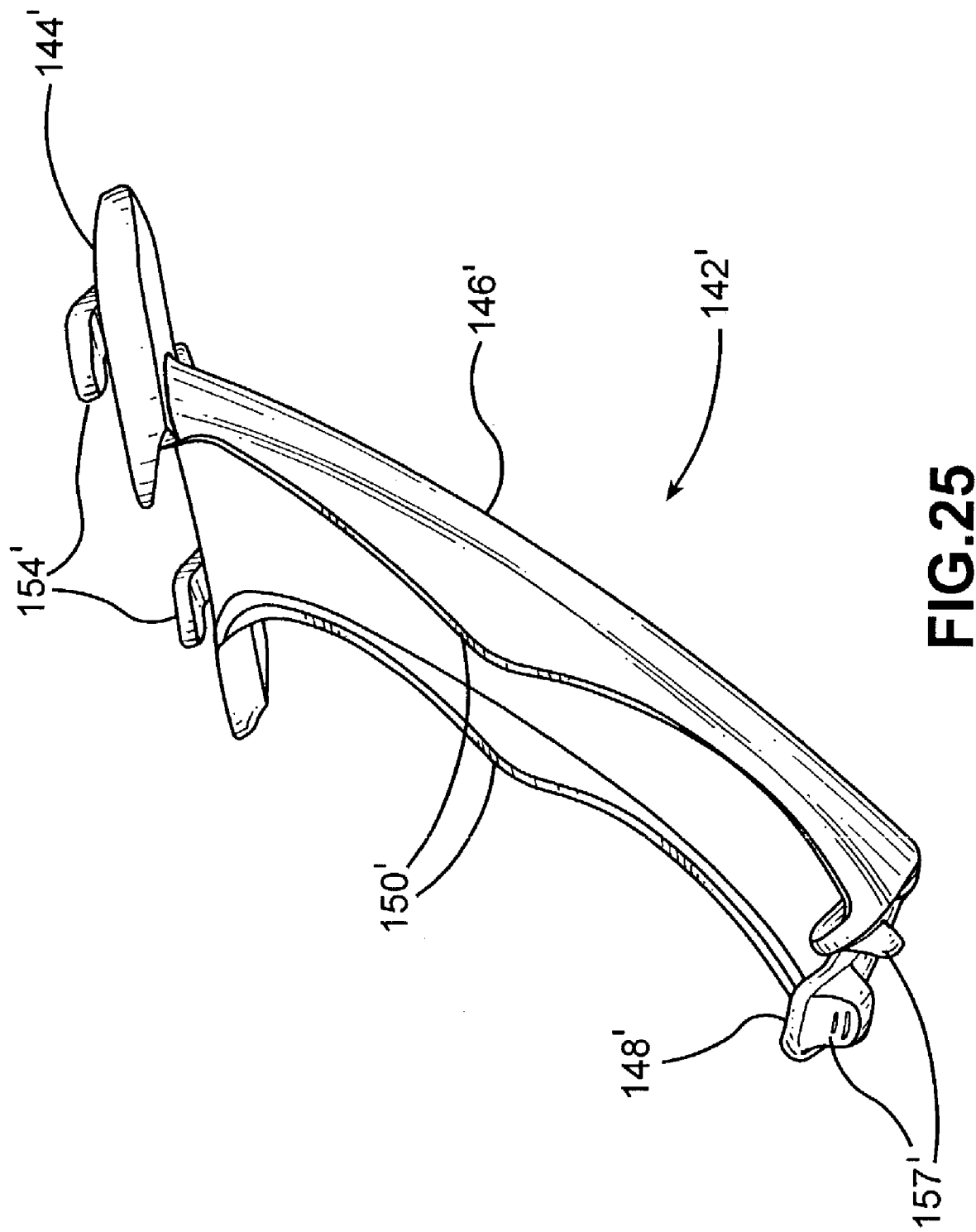
FIG. 25 is a perspective view of an attachment bracket according to another embodiment of the invention.
Figure 26:
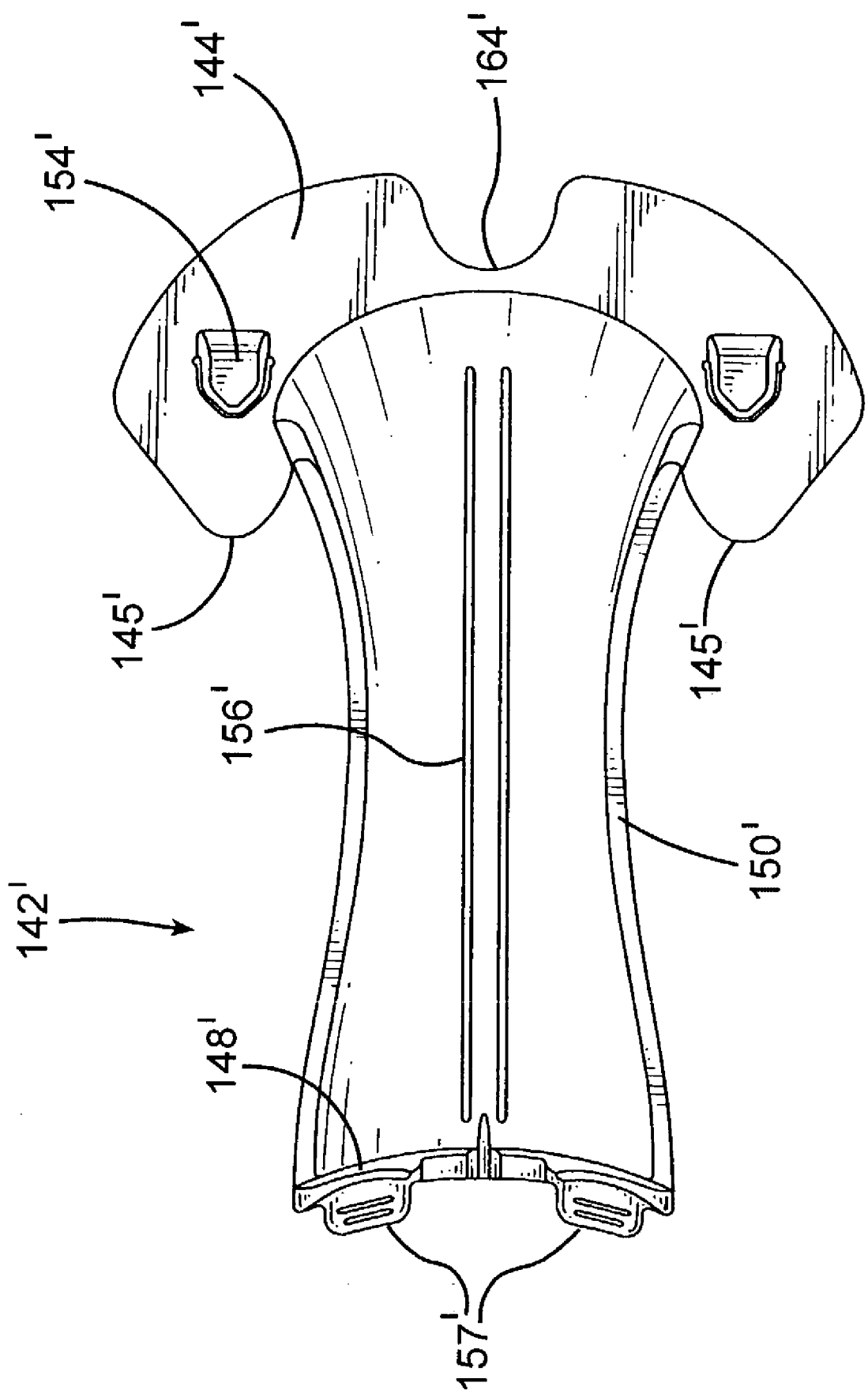
FIG. 26 is a top plan view of the bracket of FIG. 25.
Figure 27:
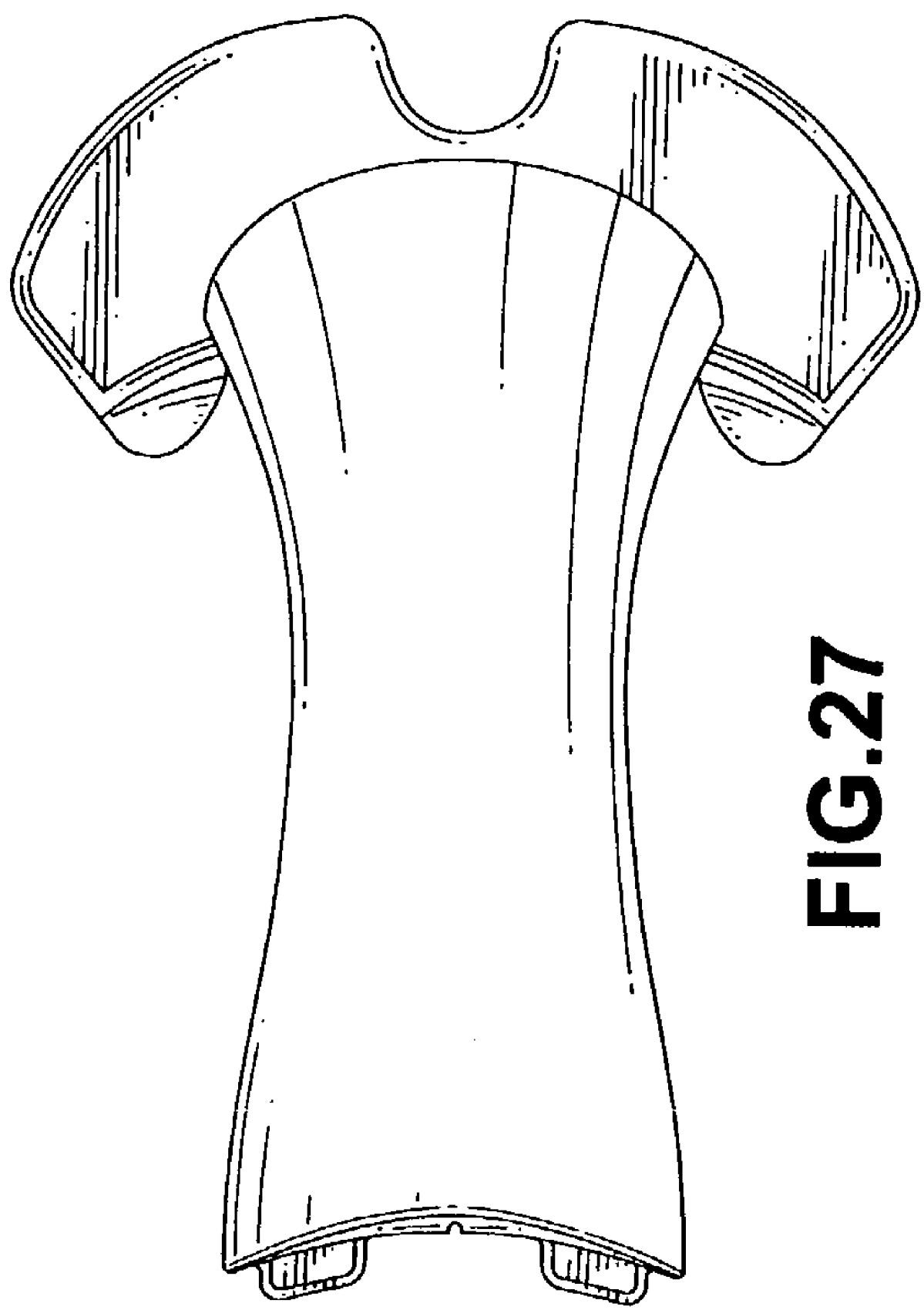
FIG. 27 is a bottom plan view of the bracket of FIG. 25.

21-24 are top plan, bottom plan, front and rear (player side) views of a second type of game controller 14'. Game controller 14' is similar to game controller 14 of FIGS. 4-8, but has different physical dimensions and a different shape. For example, grips 110'$_{LEFT}$ and 110'$_{RIGHT}$ of game controller 14' are larger and more widely spaced than is the case with controller 14. In a preferred embodiment, the width w of controller 14' is less than 8 inches. In order to attach text input device 120 to game controller 14', a different attachment bracket 142' may be used. As seen in FIG. 25, a perspective view of attachment bracket 142', bracket 142' has an attachment plate 144' having clips 154', as well as a connecting arm 146' and retaining shoulders 148'. Bracket 142' further has contoured edges 150' on arm 146'. FIG. 26 is a top plan view of bracket 142', and shows the interior of arm 146'. Located at the bottom of arm 146' is a cable retaining groove 156', the operation of which is described below. FIG. 27 is a bottom plan view of bracket 142'. Attachment plate 144' of bracket 142' attaches to text input device 120 similar to attachment plate 144 of bracket 142, as previously described. Alternatively, and as discussed in connection with bracket 142, button 136 could be omitted from text input device 120, with bracket 142' retaining text input device 120 by the pinching action of clips 154'. As with bracket 142, a pair of tabs 157' extend from the retaining shoulders 148' of bracket 142'. Tabs 157' allow convenient removal of bracket 142' (and attached text input device 120) from game controller 14'. By pushing downward on tabs 157' from the top side of game controller 14', bracket 142' can be disengaged from game controller 14'.

Similar to bracket 142, arm 146' of bracket 142' acts a flexible beam to hold text input device 120 in place. In particular, attachment plate 144' is first attached to text input device 120 in a manner similar to attachment plate 144. Unlike game controller 14, however, wings 124 do not rest upon grips 110' when text input device 120 is attached to game controller 14'. Instead, tips 145' of attachment plate 144' rest upon the lower portion of the upper face of main body portion 112' of game controller 14'. Specifically, the undersides of tips 145' are placed in contact with main body portion 112'. Arm 146' is then bowed slightly outward. In other words, the ends of arm 146' are moved in the direction opposite to that in which the tips of the "U" of the arm cross-section point, while the middle of arm 146' is moved slightly in the opposite direction. As it is being bowed, the retaining shoulders 148' slip over and contact the lower edge of front 170'. The elasticity of the arm 146' then causes the inside faces of the shoulders 148' to be pressed against the lower edge of front 170', while the undersides of tips 145' are pulled into contact with main body portion 112'. In this manner, text input device 120 can be attached to game controller 14' without cutting into or otherwise modifying the outer housing of game controller 14'.

Figure 23:
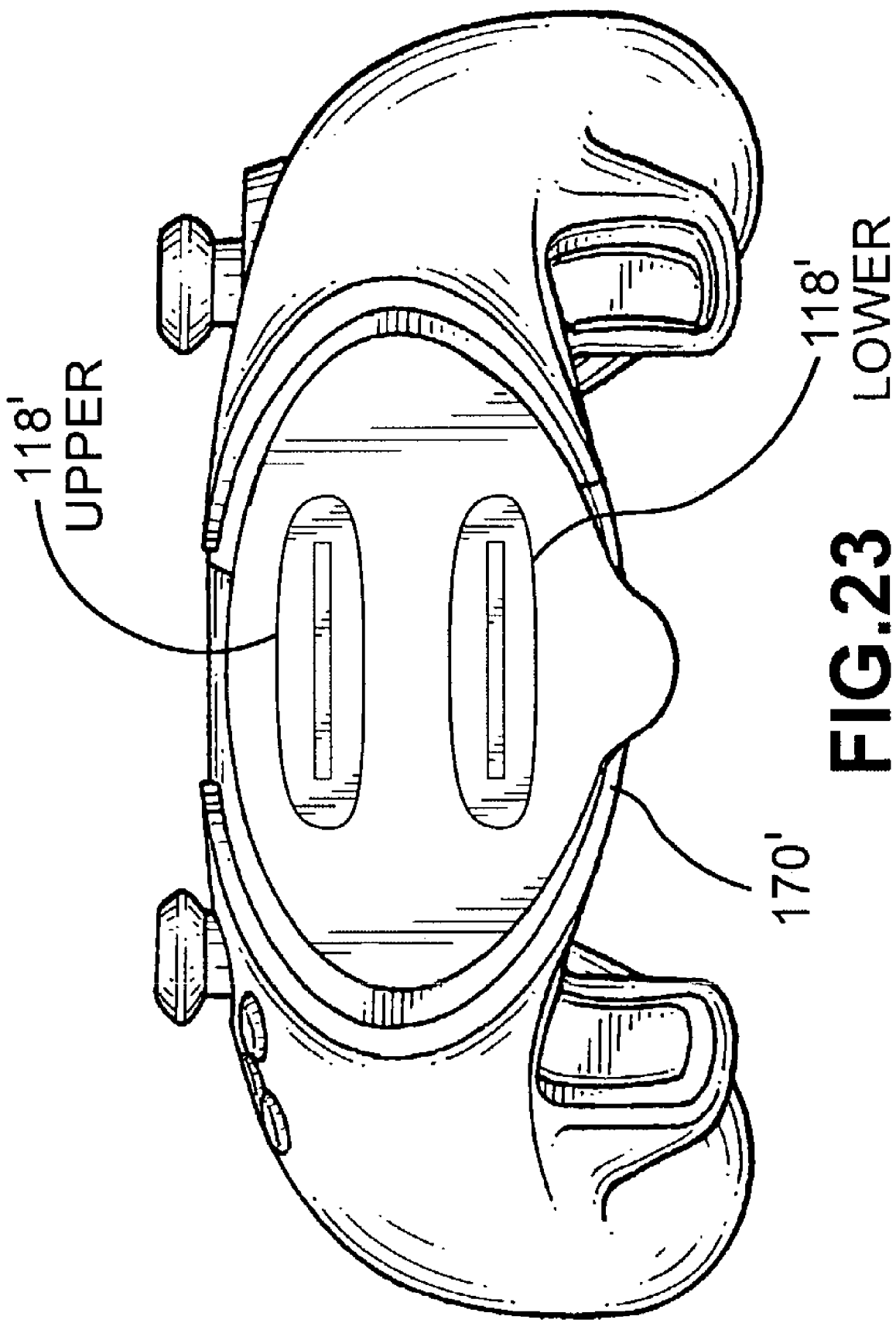
FIG. 23 is a front view of the game controller of FIG. 21.
Figure 24:
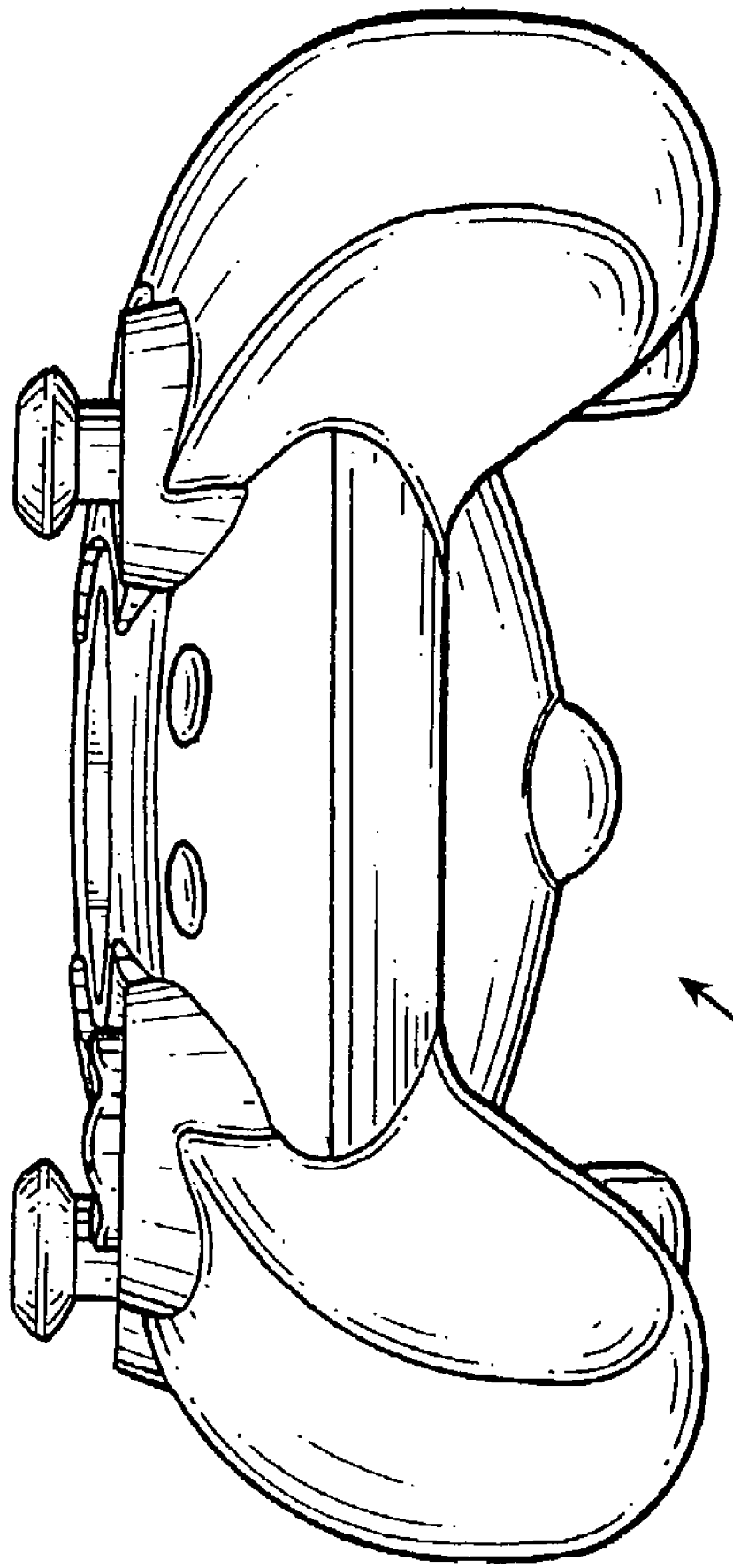
FIG. 24 is a rear (or player side) view of the game controller of FIG. 21.
Figure 28:
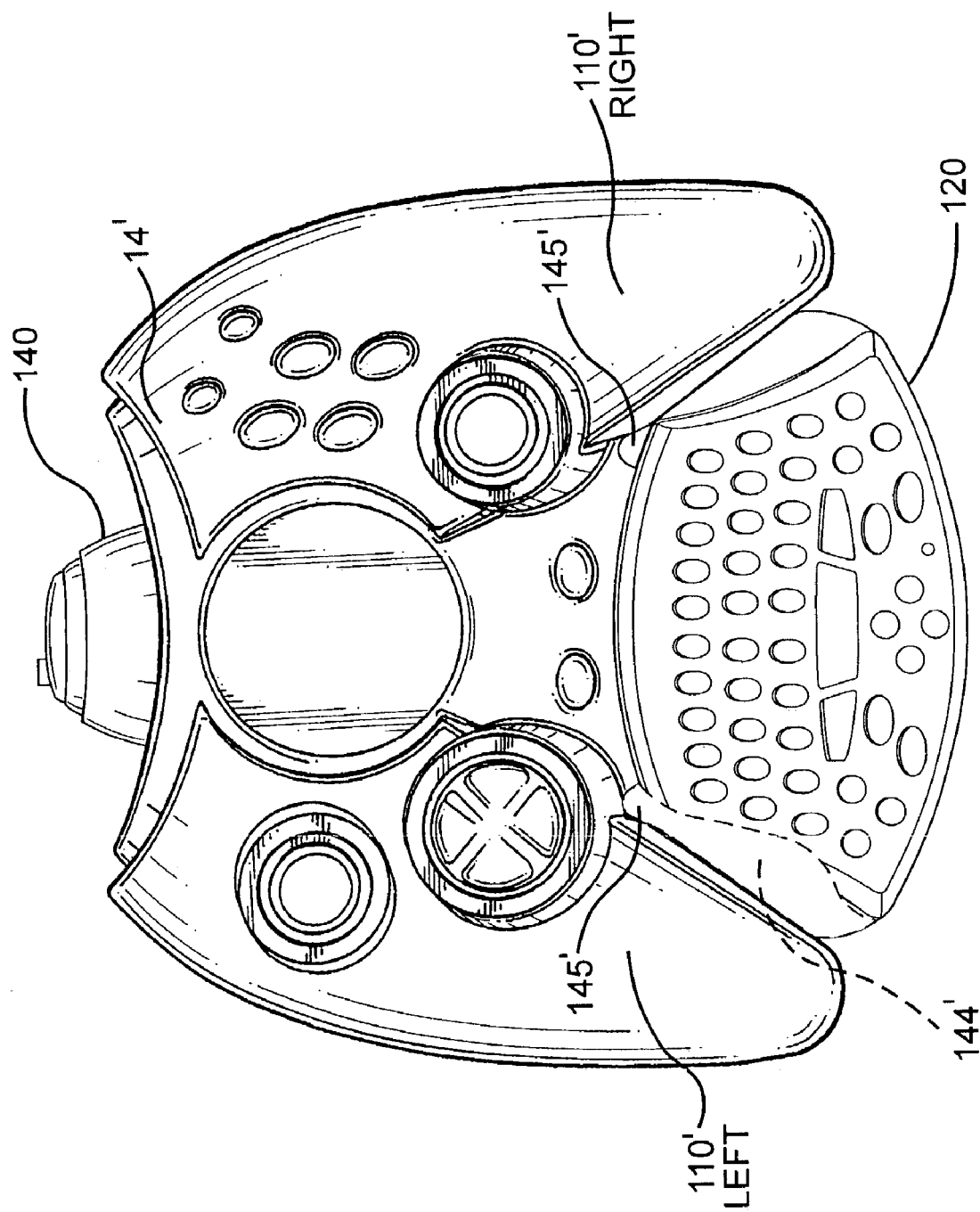
FIG. 28 is a top plan view of the game controller of FIG. 21 with attached text input device of FIG. 10, with a portion of the text input device removed.
Figure 29:
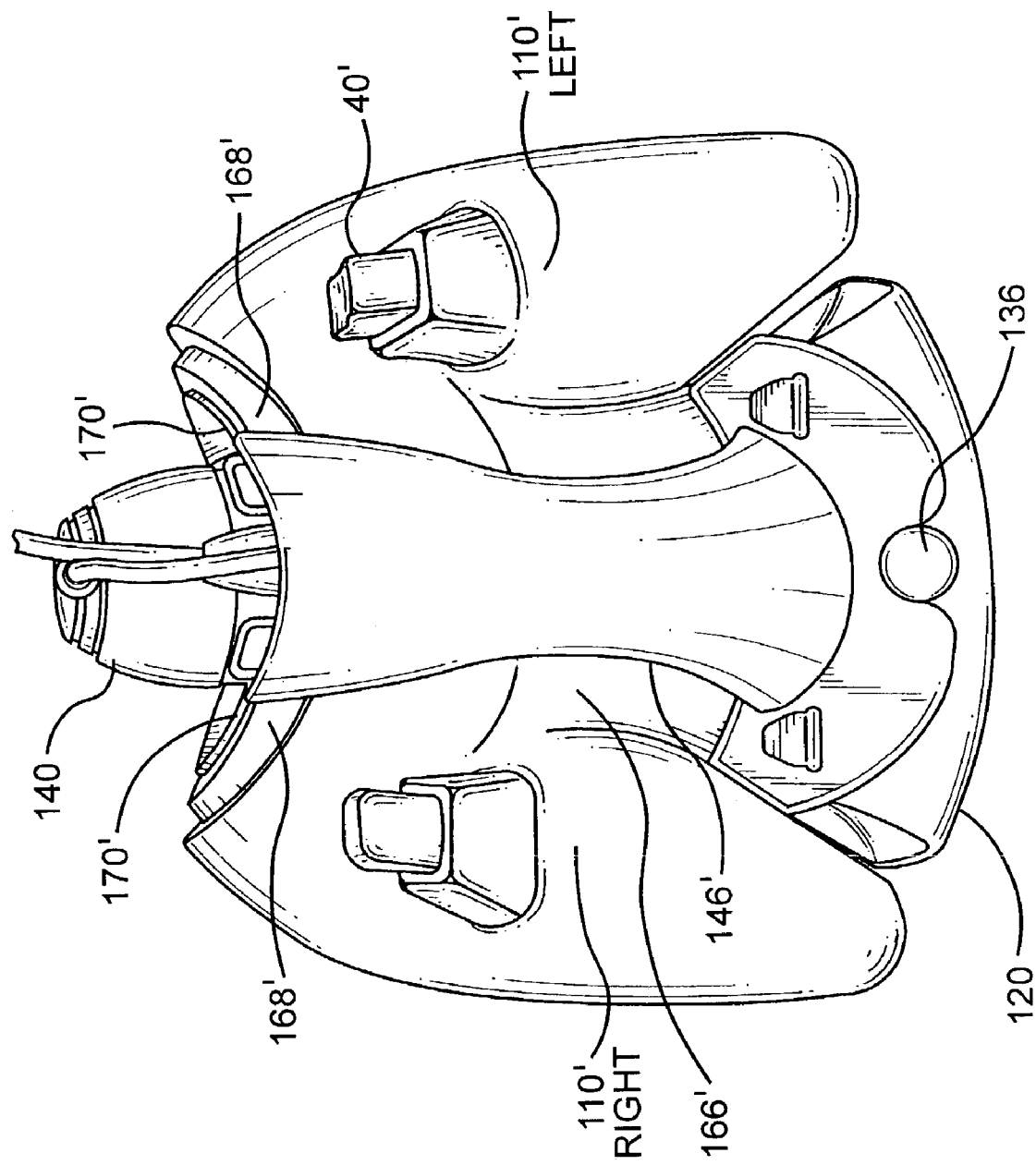
FIG. 29 is a bottom plan view of the game controller of FIG. 21 with attached text input device of FIG. 10 and bracket of FIG. 25.
Figure 30:
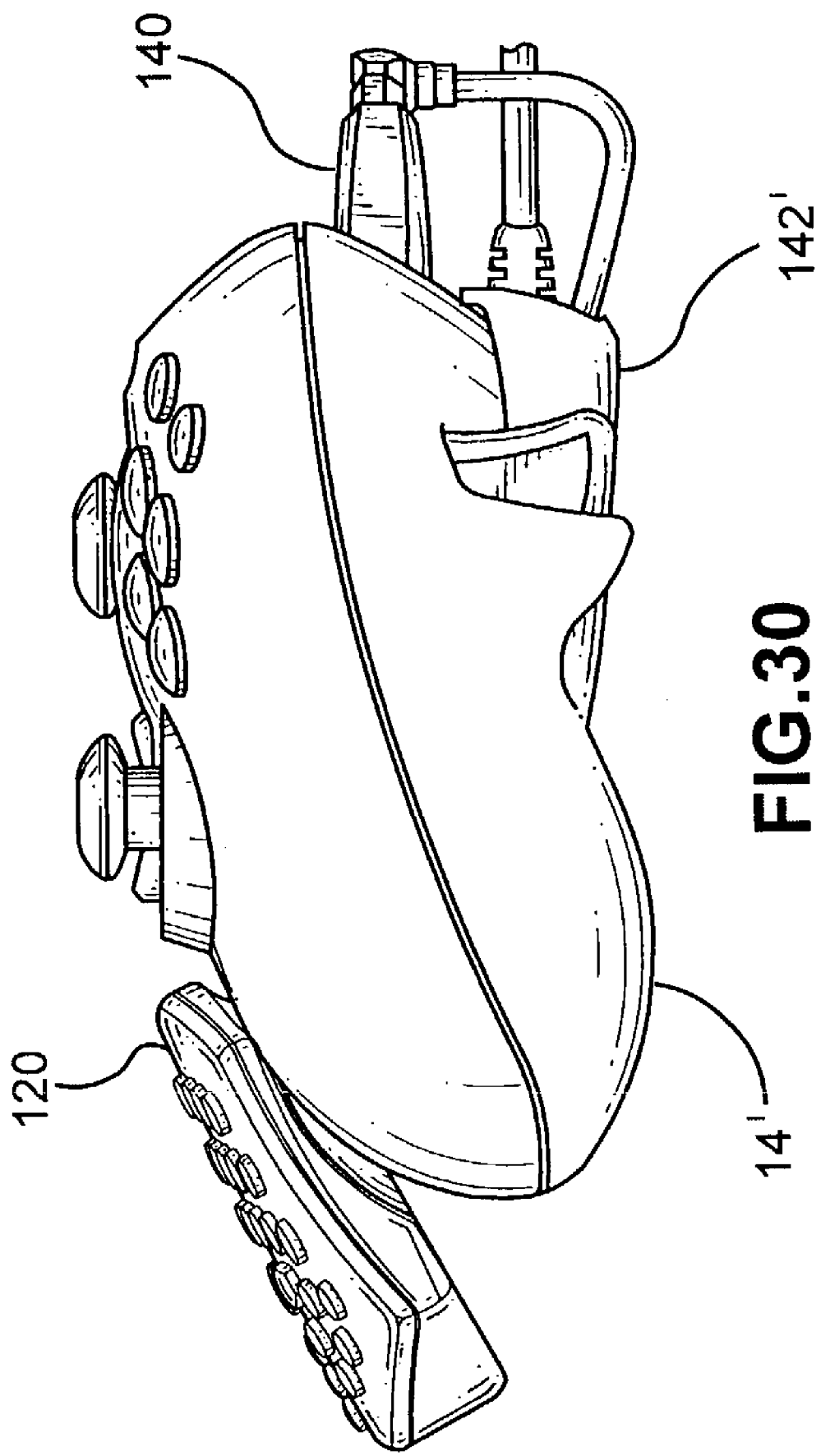
FIG. 30 is a side view of the game controller of FIG. 21 with attached text input device of FIG. 10 and bracket of FIG. 25.

FIGS. 28-30 show installation of text input device 120 on game controller 14'. FIG. 28 is a top plan view of game controller 14' with text input device 120 attached. The left side of text input device 120 has been removed, with the outline shown in broken lines, to further illustrate the attachment. Text input device 120 rests between the inside outer surfaces 113'$_{LEFT}$ and 113'$_{RIGHT}$ of grips 110'. FIG. 29 is a bottom plan view of game controller 14' with text input device 120 and bracket 142' attached, and further shows that wings 124 are separated from grips 110'. Arm 146' of bracket 142' extends to the front of main body portion 112', with the upper edges 150' of arm 146' (see FIG. 25) conforming to the underside 166' of main body portion 112'. Retaining shoulders 148' wrap over the bottom edge 168' of main body portion 112' and extend over the front 170' of game controller 14'. Connector 140 plugs into one of ports 118' (FIG. 23). FIG. 30 is a side view of game controller 14' with installed text input device 120, and further shows cooperation of the various components.

As seen by comparison of FIGS. 13 and 26, the shape of groove 156 is different from that of groove 156'. In each case, the groove serves to restrain cable 138 inside of arm 146 or 146'. Grooves 156 and 156' are sized such that cable 138 can be easily pressed into the groove, but then removed by pulling lightly upward. Because game controller 14 is slightly smaller than game controller 14', arm 146 is slightly shorter than arm 146'. So as to gather the excess length of cable 138 when text input device 120 is attached to game controller 14, groove 156 in arm 146 is serpentine in shape. Conversely, groove 156' of arm 146' is straight. Grooves 156 and 156' need not extend as far toward the ends of brackets 142 and 142' as is shown in FIGS. 13 and 26. In some embodiments, groove 156 (or 156') terminates at a point that is more distant from the front end (i.e., the end that is positioned toward the front of the game controller) of bracket 142 (or 142') than is shown. In one embodiment, groove 156 (or groove 156') terminates approximately one inch from the point on the front of bracket 142 (or bracket 142') from which cable 138 exits.

By providing a single text input device and different attachment brackets, different types of game controllers can be more economically retrofit with a text input device. Because each bracket is a relatively simple structure and has few (one) components and fabrication steps, it is less expensive to fabricate multiple types of attachment arm and a single type of text input device than to fabricate multiple types of text input devices. The outside of arm 146 or of arm 146' can have any desired shape.

Upper and lower housings 172 and 180 of text input device 120 may be formed from any suitable materials. In a preferred embodiment, housings 172 and 180 are molded from glass-filled polycarbonate. Similarly, brackets 142 and 142' may also be molded from glass-filled polycarbonate. Use of such a material provides enhanced creep resistance.

Although several examples of carrying out the invention have been described, those skilled in the art will appreciate that there are numerous variations and permutations of the above described examples that fall within the spirit and scope of the invention. The physical shapes and configurations shown are merely examples. Numerous other shapes and configurations are possible. Numerous modifications and other implementations are within the scope of the invention, which is only limited by the following claims.

The invention claimed is:

1. An attachment bracket for coupling a text input device to a game controller, comprising:

an arm portion having first and second ends;

an attachment plate fixed to the first end, the attachment plate having at least one text input device engaging member fixed thereto; and at least one retaining member protruding from the second end in a position such that, when the attachment plate is coupled to a first part of a game controller and the retaining member is in contact with a second part of the game controller, a force is applied to a face of the retaining member by the second part of the game controller so as to maintain the coupling of the attachment plate to the game controller first part, wherein the attachment plate engaging member comprises a clip with an opening facing toward the second end, and a cutout is formed in the attachment plate and positioned behind the open end of the clip.

2. The attachment bracket of claim 1, wherein the bracket is formed from a glass-filled polycarbonate.

3. The attachment bracket of claim 1, wherein the arm comprises a cable retaining groove.

4. The attachment bracket of claim 1, further comprising a tab formed on the retaining member and positioned such that, when the attachment plate is coupled to a first part of a game controller and the retaining member is in contact with a second part of the game controller, pressure on the tab causes disengagement of the retaining member from the game controller.

5. A text input device and attachment bracket for coupling the text input device to a game controller, comprising:
   a text input device having:
      a housing having a width not exceeding 8 inches and farther having upper and lower faces,
      a plurality of text entry keys disposed on the upper face, and
      an attachment interface disposed on the lower face; and
   an attachment bracket having:
      an arm portion having first and second ends, an attachment plate fixed to the first end, the attachment plate having at least one engaging member fixed thereto and engaging the attachment interface of the text input device, and
      at least one retaining member protruding from the second end in a position such that, when the attachment plate is coupled to a first part of a game controller and the retaining member is in contact with a second part of the game controller, a force is applied to a face of the retaining member by the second part of the game controller so as to maintain the coupling of the attachment plate to the game controller first part, and wherein
   the attachment plate engaging member is non-destructively disengagable from the attachment interface of the text input device, and is subsequently re-engagable so as to permit subsequent non-destructive disengagement.

6. The text input device and attachment bracket of claim 5, wherein:
   the text input device includes a plurality of conformal wings laterally protruding from the housing,
   the conformal wings have upper and lower surfaces,
   the lower wing surfaces have a curved surface adapted for conformally resting upon a grip portion of a game controller, and
   the lower surfaces are positioned such that the attachment plate is couplable to a first part of a game controller in a manner such that, when the retaining member is in contact with a second part of the game controller, the lower surfaces are compressed against grip portions of the game controller.

7. The text input device and attachment bracket of claim 6, wherein each lower wing surface comprises a compressible material covering.

8. The text input device and attachment bracket of claim 7, wherein the compressible material is rubber.

9. The text input device and attachment bracket of claim 5, wherein at least 20 text entry keys are disposed on the upper face.

10. The text input device and attachment bracket of claim 5, wherein the plurality of text entry keys comprises at least 26 letter keys, each of the letter keys generating a different letter of the alphabet when individually pressed.

11. The text input device and attachment bracket of claim 5, wherein:
   the attachment interface comprises an opening formed in the lower face and a space inside the housing and proximate to the opening, the space and the opening forming a lip on at least one side of the opening, and
   the attachment plate engaging member comprises a clip with an opening engaging the lip.

12. The text input device and attachment bracket of claim 11, wherein:
   the attachment interface farther comprises a movable protrusion on the lower face, the moveable protrusion being biased outward and inwardly movable upon application of external force thereto, and
   a cutout is formed in the attachment plate and positioned to engage the movable protrusion.

13. The text input device and attachment bracket of claim 5, farther comprising a tab formed on the retaining member and positioned such that, when the attachment plate is coupled to a first part of a game controller and the retaining member is in contact with a second part of the game controller, pressure on the tab causes disengagement of the retaining member from the game controller.

14. The text input device and attachment bracket of claim 5, farther comprising:
   a cable emanating from the housing for communication of signals resulting from user activation of one or more text entry keys, the cable having a distal end;
   a connector attached to the distal end of the cable; and
   a cable retaining groove formed in the arm.

15. The text input device and attachment bracket of claim 14, wherein in the arm is formed in the shape of a trough, and wherein the cable retaining groove is inside the trough.

16. The text input device and attachment bracket of claim 15, wherein an opening is formed in the second end of the arm and the cable extends through the opening.

* * * * *